(12) United States Patent
Ohori et al.

(10) Patent No.: US 12,119,710 B2
(45) Date of Patent: Oct. 15, 2024

(54) MOTOR HAVING STATOR COMPRISING FASTENING PORTION FOR SUPPRESSING TILT OF THE MOTOR

(71) Applicant: MITSUBA Corporation, Gunma (JP)

(72) Inventors: Ryo Ohori, Gunma (JP); Takeshi Kanai, Gunma (JP)

(73) Assignee: MITSUBA Corporation, Gunma (JP)

( * ) Notice: Subject to any disclaimer, the term of this patent is extended or adjusted under 35 U.S.C. 154(b) by 239 days.

(21) Appl. No.: 17/790,497

(22) PCT Filed: Sep. 1, 2021

(86) PCT No.: PCT/JP2021/032107
§ 371 (c)(1),
(2) Date: Jun. 30, 2022

(87) PCT Pub. No.: WO2022/080030
PCT Pub. Date: Apr. 21, 2022

(65) Prior Publication Data
US 2023/0059962 A1    Feb. 23, 2023

(30) Foreign Application Priority Data

Oct. 15, 2020   (JP) ................. 2020-174064

(51) Int. Cl.
*H02K 1/18*       (2006.01)
*H02K 7/116*     (2006.01)
*H02K 21/16*     (2006.01)

(52) U.S. Cl.
CPC ............. *H02K 1/185* (2013.01); *H02K 7/116* (2013.01); *H02K 21/16* (2013.01)

(58) Field of Classification Search
CPC .......... H02K 1/18; H02K 1/185; H02K 7/116; H02K 21/16

(Continued)

(56) References Cited

U.S. PATENT DOCUMENTS

| 11,539,264 | B2 * | 12/2022 | Takeno | ................. H02K 7/006 |
| 2003/0151315 | A1 * | 8/2003 | Choi | ........................ H02K 7/14 310/58 |

(Continued)

FOREIGN PATENT DOCUMENTS

| EP | 3220513 | 9/2017 |
| JP | 2008306842 | 12/2008 |
| JP | 2019187132 | 10/2019 |

OTHER PUBLICATIONS

Honda et al., English Machine Translation of JP 2008306842 (Year: 2008).*

(Continued)

*Primary Examiner* — Rashad H Johnson
(74) *Attorney, Agent, or Firm* — JCIPRNET

(57) ABSTRACT

The motor comprises: a stator around which coils are wound and which forms a rotating magnetic field rotating a rotor; and a first motor case housing the stator. The stator has: a core body portion forming an annular magnetic path; and a fastening portion projecting outside in the radial direction from the outer circumferential surface of the core body portion. The fastening portion has an attachment hole which is formed in a penetrating manner along the rotating axis line direction of the rotor and into which a fastening screw for fixing the stator to the first motor case is inserted. The first motor case has: first to third core receiving portions receiving an end portion of the core body portion in the rotating axis line direction; and first and second fastener receiving portions receiving an end portion of the fastening portion in the rotating axis line direction.

7 Claims, 14 Drawing Sheets

(58) Field of Classification Search
USPC .......................................................... 310/431
See application file for complete search history.

(56) References Cited

U.S. PATENT DOCUMENTS

| | | | | |
|---|---|---|---|---|
| 2009/0021104 | A1* | 1/2009 | Hattori | H02K 1/185 |
| | | | | 310/254.1 |
| 2012/0104902 | A1* | 5/2012 | Fukui | H02K 24/00 |
| | | | | 310/68 B |
| 2014/0132122 | A1* | 5/2014 | Furukawa | H02K 5/15 |
| | | | | 310/68 B |
| 2014/0327331 | A1* | 11/2014 | Hikita | H02K 7/006 |
| | | | | 310/71 |
| 2014/0333165 | A1* | 11/2014 | Hikita | H02K 3/522 |
| | | | | 310/71 |
| 2015/0084478 | A1* | 3/2015 | Yamashita | H02K 5/00 |
| | | | | 310/216.114 |
| 2015/0364966 | A1* | 12/2015 | Maihara | H02K 5/24 |
| | | | | 310/51 |
| 2017/0141628 | A1* | 5/2017 | Nose | H02K 5/161 |
| 2018/0163721 | A1* | 6/2018 | Takahashi | F04B 53/00 |
| 2018/0241261 | A1* | 8/2018 | Yamashita | H02K 1/16 |
| 2019/0229576 | A1* | 7/2019 | Miura | H02K 1/185 |
| 2020/0036261 | A1* | 1/2020 | Uchibori | H02K 21/14 |
| 2020/0227960 | A1* | 7/2020 | Ohori | H02K 1/278 |
| 2020/0232477 | A1* | 7/2020 | Kataoka | F04D 29/528 |
| 2020/0301131 | A1* | 9/2020 | Yawata | G02B 26/0816 |
| 2020/0366158 | A1* | 11/2020 | Morishita | B62D 5/0403 |
| 2021/0028678 | A1* | 1/2021 | Ohori | H02K 21/16 |
| 2021/0399600 | A1* | 12/2021 | Hattori | H02K 1/32 |
| 2022/0094245 | A1* | 3/2022 | Shin | H02K 15/0043 |
| 2022/0407389 | A1* | 12/2022 | Hayami | H02K 9/06 |
| 2023/0016162 | A1* | 1/2023 | Toriyama | H02K 3/522 |
| 2023/0059962 | A1* | 2/2023 | Ohori | H02K 5/04 |

OTHER PUBLICATIONS

"International Search Report (Form PCT/ISA/210) of PCT/JP2021/032107," mailed on Nov. 22, 2021, with English translation thereof, pp. 1-4.

"Office Action of Japan Counterpart Application", issued on May 9, 2023, with English translation thereof, p. 1-p. 8.

"International Preliminary Report on Patentability of PCT/JP2021/032107; this report contains the following items: Form PCT/IB/326, PCT/IB/338, PCT/IB/373, PCT/ISA237(cover sheet), PCT/ISA237(Box No. I), PCT/ISA237(Box No. V)", mailed on Apr. 27, 2023, Apr. 13, 2023 and Nov. 22, 2021, which is English translation of "Written Opinion of the International Searching Authority", p. 1-p. 11.

"Search Report of Europe Counterpart Application", issued on Feb. 26, 2024, p. 1-p. 10.

* cited by examiner

MOTOR HAVING STATOR COMPRISING FASTENING PORTION FOR SUPPRESSING TILT OF THE MOTOR

CROSS-REFERENCE TO RELATED APPLICATION

This application is a 371 application of the International PCT application serial no. PCT/JP2021/032107, filed on Sep. 1, 2021, which claims the priority benefits of Japan Patent Application No. 2020-174064, filed on Oct. 15, 2020. The entirety of each of the above-mentioned patent applications is hereby incorporated by reference herein and made a part of this specification.

TECHNICAL FIELD

The present invention relates to a motor.

RELATED ART

As the motor used for a vehicle wiper device or the like, there is a motor in which a rotor is arranged on the radial inner side of a stator wound with coils, and the stator and the rotor are accommodated in a frame (see, for example, Patent Literature 1). In some motors of this type, the stator accommodated in the frame is supported by core receiving portions of the frame in a state of being fastened by a pair of fastening screws. The stator has an annular core body portion, and a pair of fastening screws are arranged on the outer circumference (that is, the radial outer side) of the core body portion.

CITATION LIST

Patent Literature

[Patent Literature 1] Japanese Patent Laid-Open No. 2019-187132

SUMMARY OF INVENTION

Technical Problem

However, when the fastening screw is arranged on the outer circumference of the core body portion and fastened, there is a possibility that the radial center portion of the stator may be deformed to rise in the axial direction with the core receiving portion as a fulcrum. Since the radial center portion of the stator rises, for example, the stator tilts in a direction intersecting between two points of the two fastening screws, and it is difficult to ensure the roundness of the inner diameter of the stator. For this reason, the operating noise of the motor deteriorates, and further the rotor and the stator may interfere with each other.

Therefore, the present invention provides a motor capable of suppressing the tilt of the stator and further controlling the tilt direction of the stator by preventing the stator from rising.

Solution to Problem

In order to solve the above problem, a motor according to the present invention includes: a stator around which coils are wound and which forms a rotating magnetic field for rotating a rotor; and a frame which houses the stator. The stator includes: a core body portion which forms an annular magnetic path; and a fixing portion which projects toward a radial outer side from an outer circumferential surface of the core body portion. The fixing portion has a fixing hole which is formed to penetrate along a rotating axis line direction of the rotor and through which a fixing member for fixing the stator to the frame is inserted. The frame includes: a core receiving portion which receives an end portion of the core body portion in the rotating axis line direction; and a fixing receiving portion which receives an end portion of the fixing portion in the rotating axis line direction.

Effects of Invention

According to the present invention, by preventing the stator from rising, the tilt of the stator can be suppressed and further the tilt direction of the stator can be controlled.

DESCRIPTION OF EMBODIMENTS

Next, embodiments of the present invention will be described with reference to the drawings.

<Motor Device>

Figure 1:
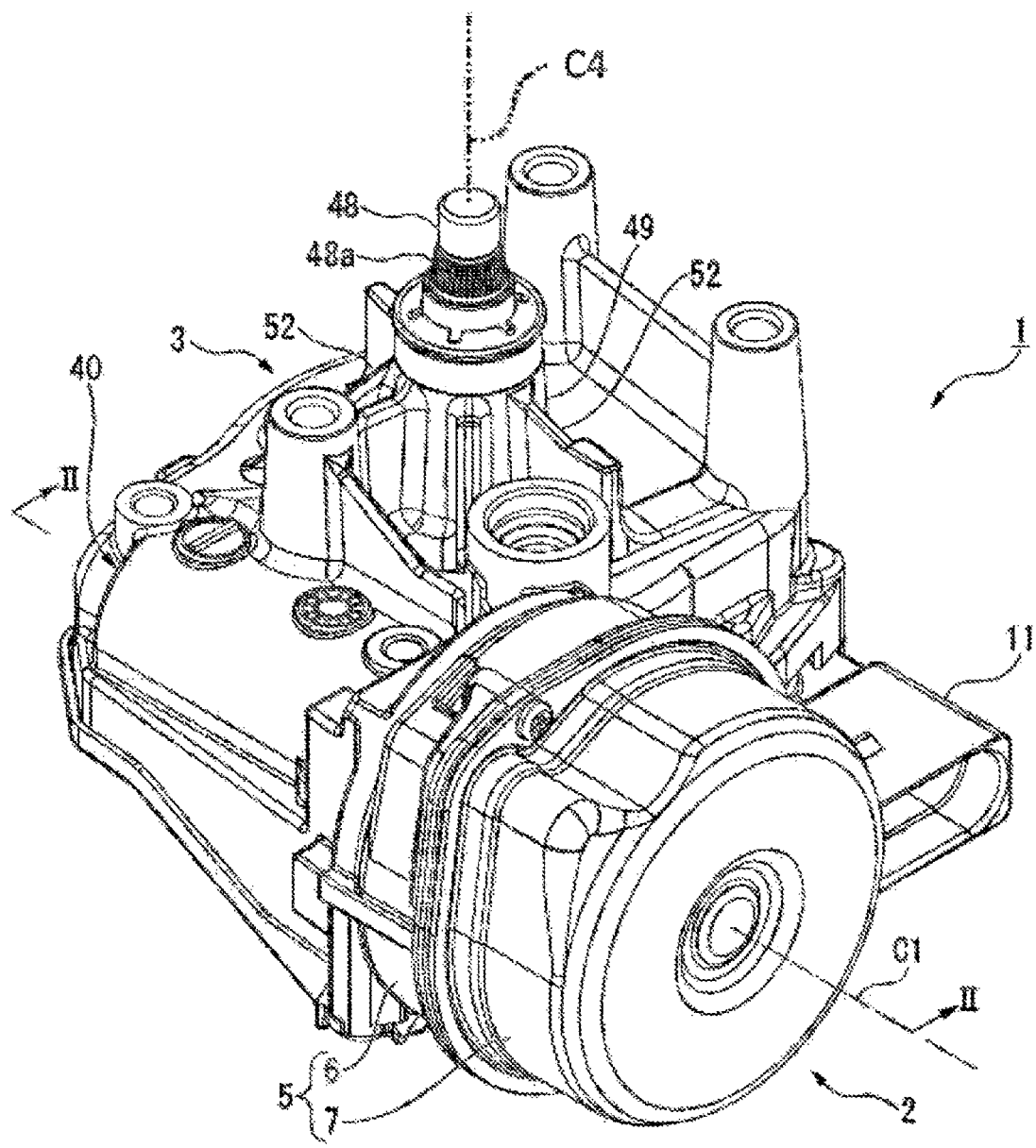
FIG. 1 is a perspective view of the motor device according to an embodiment of the present invention.
Figure 2:
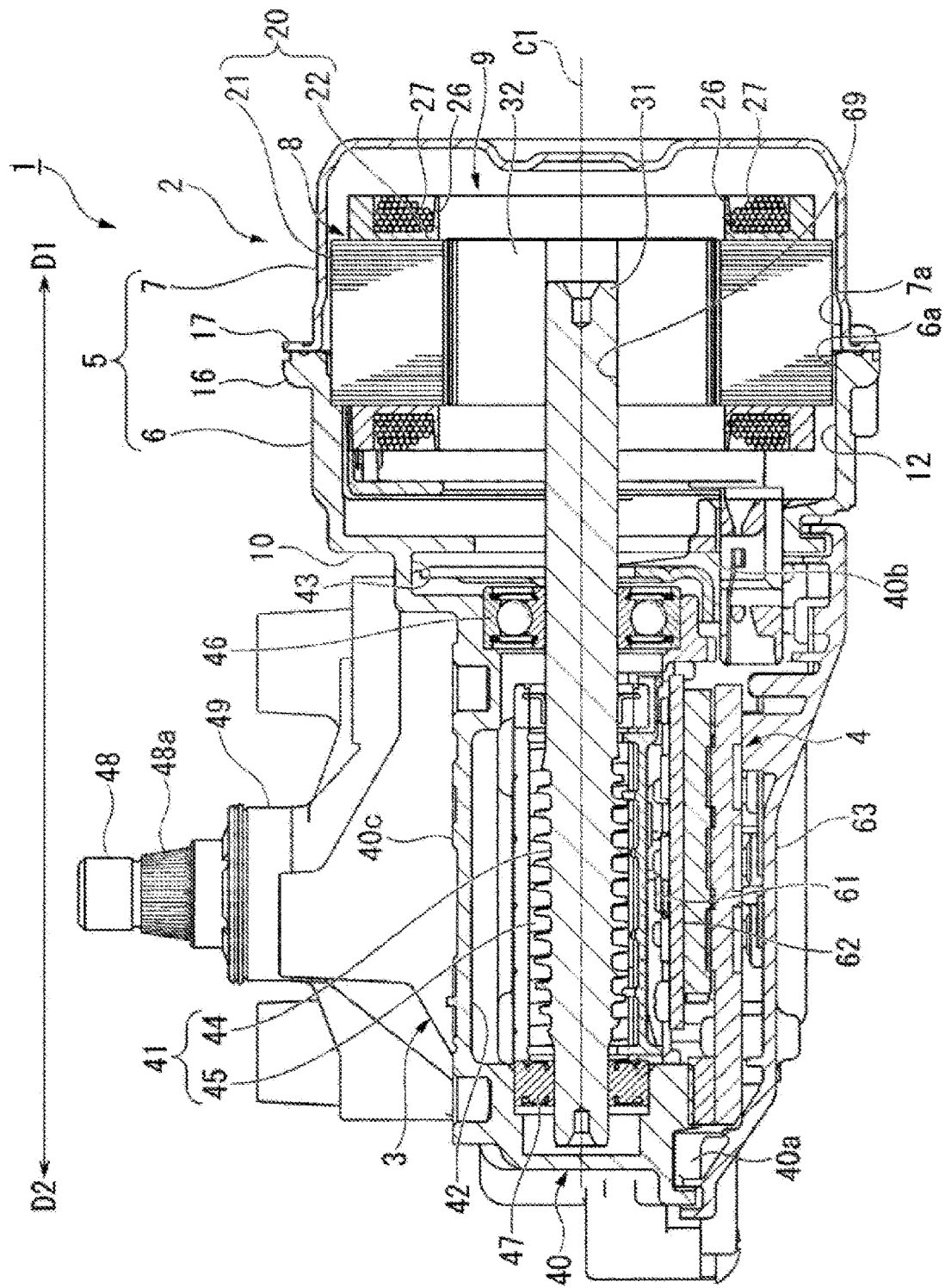
FIG. 2 is a cross-sectional view taken along the line II-II of FIG. 1.

FIG. 1 is a perspective view of a motor device 1 used in a vehicle. FIG. 2 is a cross-sectional view taken along the line II-II of FIG. 1. The motor device 1 is used, for example, as a drive source for a wiper device of the vehicle. As shown in FIG. 1 and FIG. 2, the motor device 1 includes a motor 2, a decelerator 3 that decelerates and outputs the rotation of the motor 2, and a controller 4 that performs the drive control of the motor 2. In the following description, the term "axial direction" simply means the direction along the rotating axis line direction of a rotating shaft 31 of the motor 2. The term "circumferential direction" simply means the circumferential direction of the rotating shaft 31. The term "radial direction" simply means the radial direction of the rotating shaft 31. Further, in the "axial direction," one end side of the rotating shaft 31 (the side where the arrow points to D1 in FIG. 2 and FIG. 3) is referred to as the "first direction," and the other end side of the rotating shaft 31 (the side where the arrow points to D2 in FIG. 2 and FIG. 3) is referred to as the "second direction."

<Motor>

The motor 2 includes a motor case 5, a substantially cylindrical stator 8 housed in the motor case 5, and a rotor 9 arranged on the radial inner side of the stator 8 and provided rotatably with respect to the stator 8. The motor 2 of the present embodiment is a so-called brushless motor that does not require a brush to supply electric power to the stator 8.

The motor case 5 is made of a material having excellent heat dissipation such as an aluminum alloy. The motor case 5 is composed of a first motor case (frame) 6 configured to be divisible in the axial direction, and a second motor case 7. The first motor case 6 and the second motor case 7 are each formed in a bottomed cylindrical shape. The first motor case 6 is integrally molded with a gear case 40, so that a bottom portion 10 is connected to the gear case 40 of the decelerator 3. The first motor case 6 and the gear case 40 are formed into a predetermined shape by casting and molding a molten aluminum alloy or the like. A through hole through which the rotating shaft 31 of the motor 2 can be inserted is formed at substantially the center of the bottom portion 10 in the radial direction. In the present embodiment, the motor case 5 and the gear case 40 constitute a casing of the motor device 1.

Further, outer flange portions 16 and 17 extending toward the radial outer side are respectively formed at the openings 6a and 7a of the first motor case 6 and the second motor case 7. The motor case 5 has an internal space formed by abutting the outer flange portions 16 and 17 against each other. The stator 8 and the rotor 9 are arranged in the internal space of the motor case 5. The stator 8 is press-fitted and fixed to a step portion (first, second, and third core receiving portions 71, 72, and 73 (see FIG. 5) described later) formed on an inner circumferential wall 12 of the first motor case 6, and is arranged along the outer circumference of the rotor 9. The detailed structure of the first motor case 6 will be described later.

<Stator>

Figure 3:
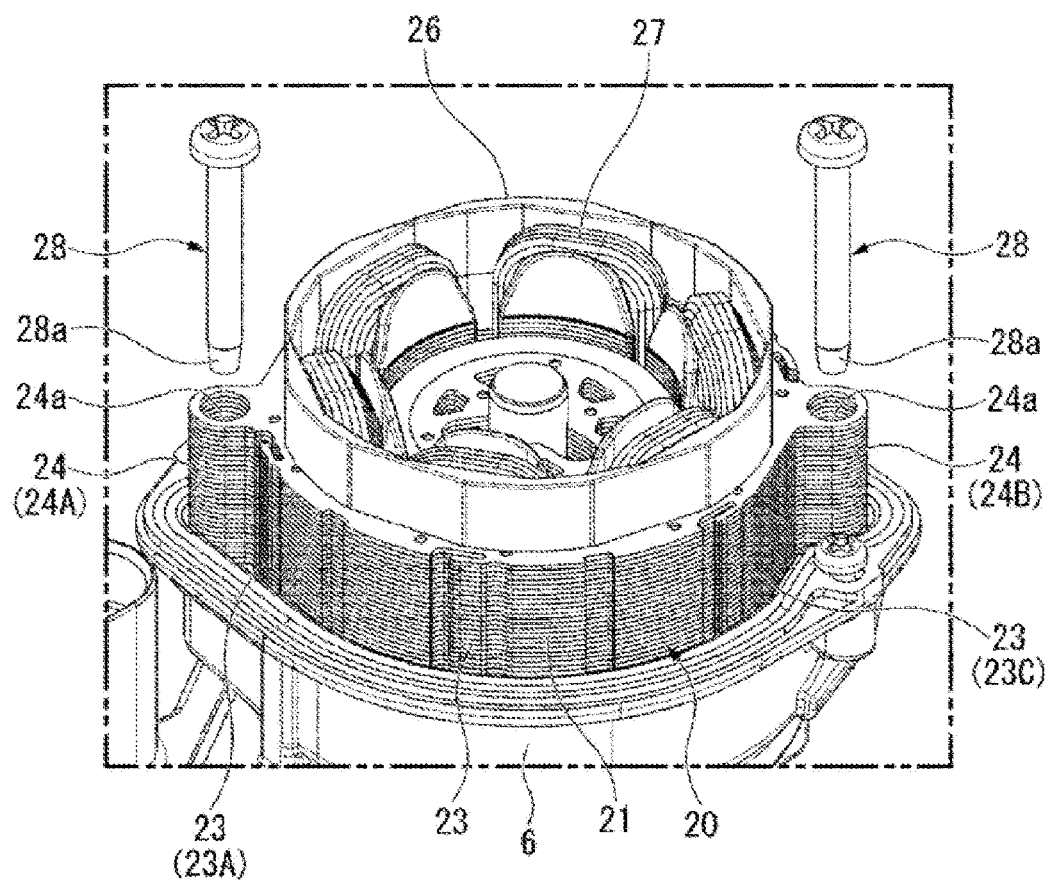
FIG. 3 is a perspective view of the motor according to an embodiment of the present invention from which the second motor case is removed.
Figure 4:
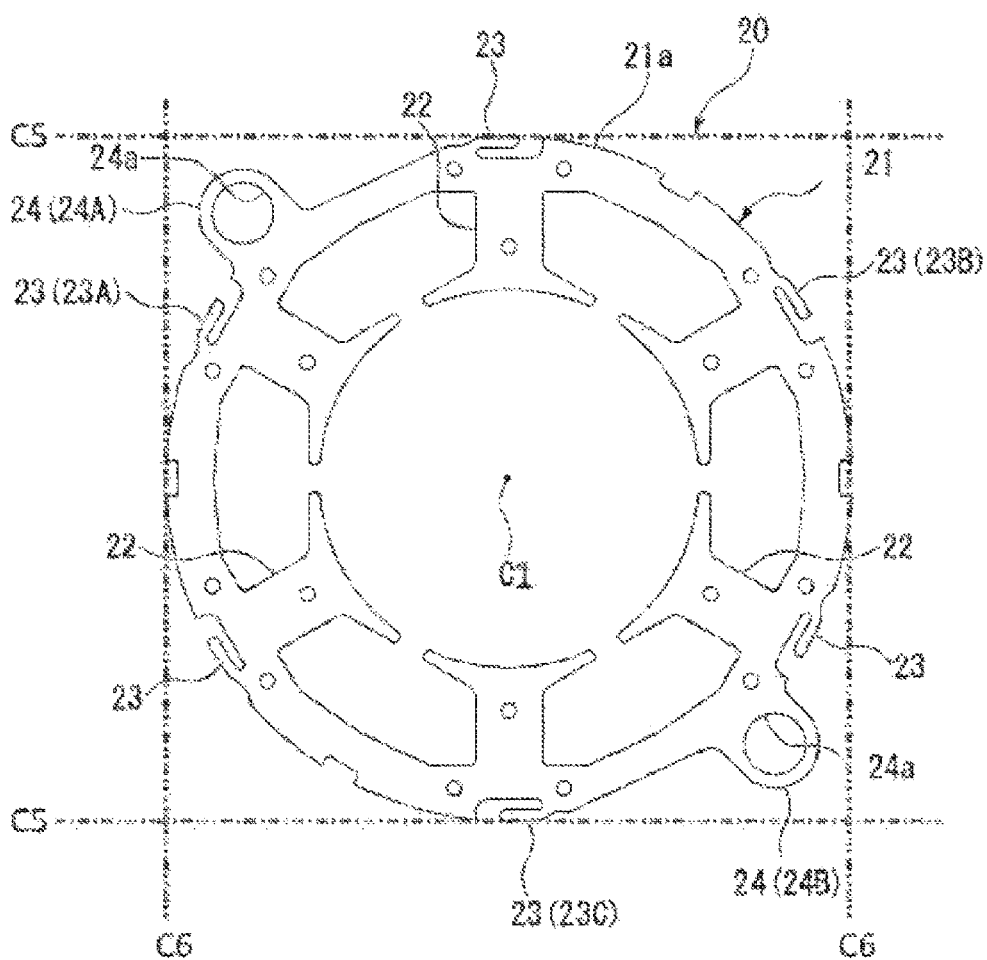
FIG. 4 is a plan view of the stator according to an embodiment of the present invention as viewed from the axial direction.

FIG. 3 is a perspective view of the motor 2 from which the second motor case 7 is removed. FIG. 4 is a plan view of the stator 8 as viewed from the axial direction. As shown in FIG. 2 to FIG. 4, the stator 8 includes a stator core 20 composed of laminated steel plates (electromagnetic steel plates) and a plurality of coils 27 wound around the stator core 20. The stator core 20 has an annular core body portion 21, a plurality of (for example, six in the present embodiment) teeth 22 projecting toward the radial inner side from the inner circumferential portion of the core body portion 21, a plurality of (for example, six in the present embodiment) manufacturing error absorbing portions 23 formed on the outer circumferential portion of the core body portion 21, and a plurality of (for example, two in the present embodiment) fastening portions (an example of the fixing portion in the claims) 24.

The manufacturing error absorbing portion 23 absorbs manufacturing errors between the motor case 5 and the stator 8. The manufacturing error absorbing portion 23 is a tongue piece that is made flexible in the radial direction by cutting off a part of the outer circumferential portion of the core body portion 21. The manufacturing error absorbing portion 23 is arranged on an extension line of the teeth 22 in the radial direction. Further, the manufacturing error absorbing portion 23 is provided on the inner circumference (that is, the radial inner side) of the outermost diameter of the core body portion 21 (specifically, the outer circumferential edge 21a of the core body portion 21).

Under such a configuration, when the stator 8 is arranged in the motor case 5, an unreasonable stress due to manufacturing errors of the motor case 5 and the stator 8 is prevented from being applied to the stator 8. That is, when the contact of the motor case 5 with the stator 8 becomes strong, the elastic bending of the manufacturing error absorbing portion 23 prevents an unreasonable stress from being applied to the stator 8. Further, since the manufacturing error absorbing portion 23 stretches with respect to the motor case 5 by elastic bending, the manufacturing error absorbing portion 23 also has a role of supporting the stator 8 in the motor case 5 in the radial direction.

The reason why the manufacturing error absorbing portion 23 is arranged on the extension line of the teeth 22 in the radial direction on the outer circumferential portion of the core body portion 21 is that the stator 8 has increased mechanical strength against an external force in the radial direction at the locations where the teeth 22 are provided and is unlikely to be deformed in the radial direction at the locations where the teeth 22 are provided. In addition, by arranging the manufacturing error absorbing portion 23 on the extension line of the teeth 22 in the radial direction, the magnetic path formed by the core body portion 21 is not obstructed. Details of this will be described later.

Here, among the six manufacturing error absorbing portions 23, the three manufacturing error absorbing portions 23 provided at intervals of 120° in the circumferential direction are supported by the first motor case 6 in the radial direction as well as in the axial direction. Hereinafter, the three manufacturing error absorbing portions 23 supported by the first motor case 6 will be described as the first manufacturing error absorbing portion 23A, the second manufacturing error absorbing portion 23B, and the third manufacturing error absorbing portion 23C.

Two fastening portions 24 are provided so as to face each other in the radial direction with the rotating axis line (axial center C1) of the rotating shaft 31 as the center. The two fastening portions 24 are provided on the outer circumference (that is, the radial outer side) with respect to the outermost diameter of the core body portion 21 (specifically, the outer circumferential edge 21a of the core body portion 21). One of the two fastening portions 24 is arranged side by side with the first manufacturing error absorbing portion 23A in the circumferential direction. Hereinafter, among the two fastening portions 24, the one fastening portion 24 arranged side by side with the first manufacturing error absorbing portion 23A in the circumferential direction will be described as the first fastening portion 24A. Among the two fastening portions 24, the one fastening portion 24 provided between the second manufacturing error absorbing portion 23B and the third manufacturing error absorbing portion 23C in the circumferential direction will be described as the second fastening portion 24B.

The first fastening portion 24A and the second fastening portion 24B are each formed with an attachment hole (an example of the fixing hole in the claims) 24a penetrating in the axial direction. A fastening screw (an example of the fixing member in the claims) 28 is inserted into each attachment hole 24a. By screwing the fastening screw 28 inserted into the attachment hole 24a into the first motor case 6, the two fastening portions 24 (that is, the stator 8) are fastened and fixed to the first motor case 6.

The first fastening portion 24A and the second fastening portion 24B are arranged on the side of the rotating shaft 31 with respect to the line (tangent line C5) perpendicular to the rotating axis line (axial center C4) of an output shaft 48, among the tangent lines of the outer circumferential edge 21a of the core body portion 21. In addition, the first fastening portion 24A and the second fastening portion 24B are arranged on the side of the rotating shaft 31 with respect to the line (tangent line C6) parallel to the rotating axis line (axial center C4) of the output shaft 48, among the tangent lines of the outer circumferential edge 21a of the core body portion 21. As a result, the fastening portions 24A and 24B can be prevented from projecting from the outer surface of the motor device 1 in the directions perpendicular to and parallel to the rotating axis line (axial center C4) of the output shaft 48, so the motor device 1 can be miniaturized.

The inner circumferential surface and each tooth 22 of the core body portion 21 are covered with an insulator 26 made of resin. The coil 27 is wound around the corresponding predetermined teeth 22 from above the insulator 26. Each coil 27 generates a magnetic field for rotating the rotor 9 by feeding power from the controller 4. The core body portion 21 forms an annular magnetic path. At this time, the magnetic path is formed in an arc shape as viewed from the axial direction across the adjacent teeth 22 in the circumferential direction. Therefore, in the outer circumferential portion of the core body portion 21, almost no magnetic flux is formed on the extension line of the teeth 22 in the radial direction. Therefore, the manufacturing error absorbing portion 23 does not obstruct the magnetic path.

<Rotor>

The rotor 9 is rotatably arranged on the radial inner side of the stator 8 via a minute gap, and rotates by receiving the magnetic field of the stator 8. The rotor 9 includes the rotating shaft 31, a substantially cylindrical rotor core 32 having a shaft core hole 69 to which the rotating shaft 31 is press-fitted and fixed on the inner circumferential portion, and four permanent magnets 33 assembled to the outer circumferential portion of the rotor core 32 (see FIG. 3, FIG. 5, FIG. 6, etc.).

The rotating shaft 31 is integrally formed with a worm shaft 44 that constitutes the decelerator 3. However, the worm shaft 44 is not limited thereto, and may be formed separately from the rotating shaft 31 and connected to the end portion of the rotating shaft 31. The rotating shaft 31 and the worm shaft 44 are rotatably supported by a gear case 40 (casing) via bearings 46 and 47. The rotating shaft 31 and the worm shaft 44 rotate around the rotating axis line (axial center C1). A ferrite magnet, for example, is used as the permanent magnet 33. However, the permanent magnet 33 is not limited thereto, and a neodymium bond magnet, a neodymium sintered magnet, or the like can also be used.

<Decelerator>

The decelerator 3 includes the gear case 40 integrated with the motor case 5, and a deceleration mechanism 41 housed in the gear case 40. The gear case 40 is made of a metal material having excellent heat dissipation such as an aluminum alloy. The gear case 40 is formed in a box shape having an opening 40a on one surface. The gear case 40 has a gear housing portion 42 that houses the deceleration mechanism 41 inside. Further, on a side wall 40b of the gear case 40, an opening 43 that communicates the gear housing portion 42 with the through hole of the first motor case 6 is formed at a location where the first motor case 6 is integrally formed.

A bearing boss 49 having a substantially cylindrical shape is provided to project on a bottom wall 40c of the gear case 40. The bearing boss 49 is for rotatably supporting the output shaft 48 of the deceleration mechanism 41, and a slide bearing (not shown) is arranged on the inner circumferential side. An O-ring (not shown) is mounted on the inner side of the tip portion of the bearing boss 49. Further, a plurality of ribs 52 for ensuring rigidity are provided to project on the outer circumferential surface of the bearing boss 49.

The deceleration mechanism 41 housed in the gear housing portion 42 is composed of the worm shaft 44 and a worm wheel 45 meshed with the worm shaft 44. Two end portions of the worm shaft 44 in the axial direction are rotatably supported by the gear case 40 via the bearings 46 and 47. The worm shaft 44 is provided coaxially and integrally with the rotating shaft 31 of the motor 2. The output shaft 48 of the deceleration mechanism 41 is coaxially and integrally provided on the worm wheel 45. The worm wheel 45 and the output shaft 48 are arranged so that the rotating axis lines thereof are substantially orthogonal to the rotating axis line (axial center C1) of the worm shaft 44 (the rotating shaft 31 of the motor 2). The output shaft 48 projects to the outside via the bearing boss 49 of the gear case 40. A spline 48a that can be connected to a motor-driven target article is formed at the projecting tip of the output shaft 48.

Furthermore, the worm wheel 45 is provided with a sensor magnet (not shown). The position of this sensor magnet is detected by a magnetic detection element 61 provided in the controller 4, which will be described later. In other words, the rotational position of the worm wheel 45 is detected by the magnetic detection element 61 of the controller 4.

<Controller>

The controller 4 has a controller board 62 on which the magnetic detection element 61 is mounted. The controller board 62 is arranged in the opening 40a of the gear case 40, so that the magnetic detection element 61 faces the sensor magnet (not shown) of the worm wheel 45. The opening 40a of the gear case 40 is closed by a cover 63.

Terminal portions of a plurality of coils 27 drawn from the stator core 20 are connected to the controller board 62. Further, the terminal of a connector 11 (see FIG. 1) provided on the cover 63 is electrically connected to the controller board 62. In addition to the magnetic detection element 61, a power module (not shown) composed of switching elements such as FETs (Field Effect Transistors) that control the drive voltage supplied to the coils 27, and a capacitor (not shown) that smoothens the voltage are mounted on the controller board 62.

<Detailed Structure of the First Motor Case>

Figure 5:
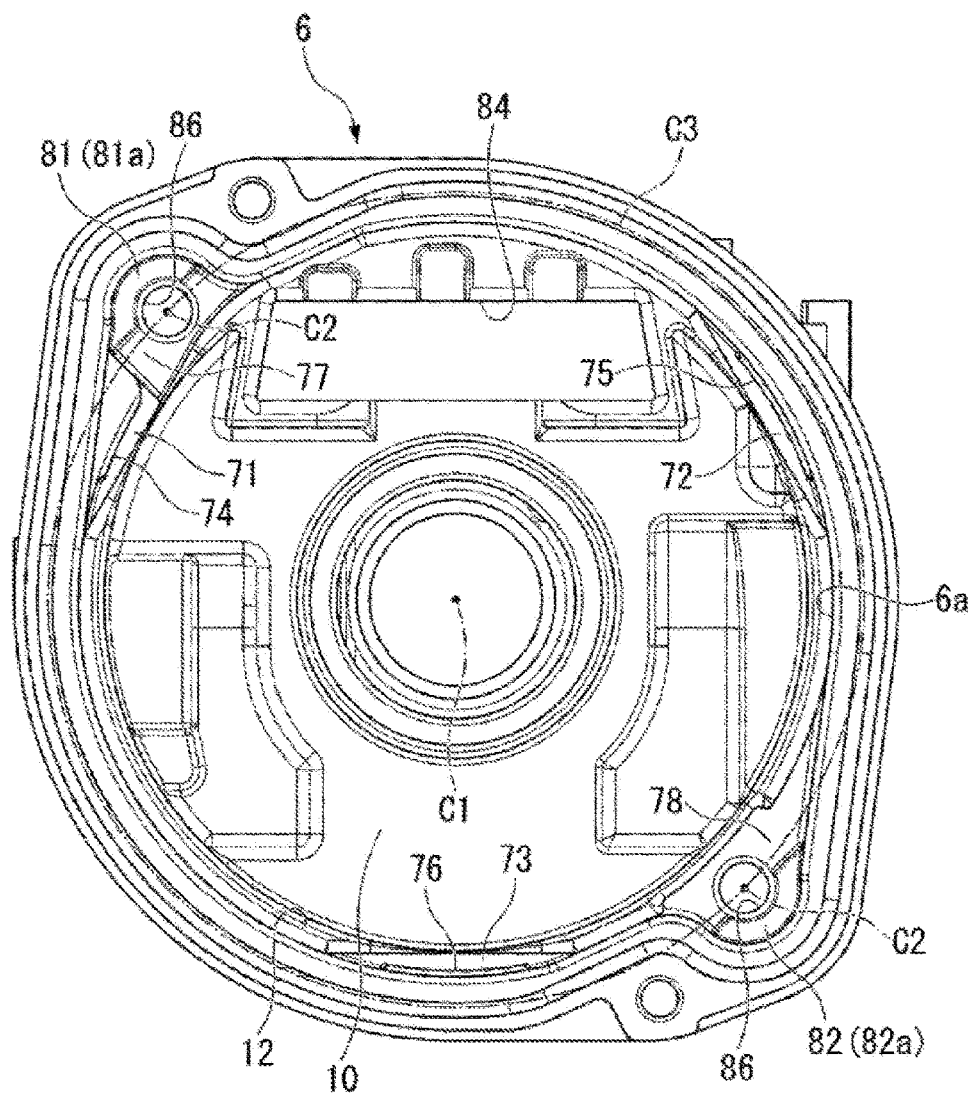
FIG. 5 is a plan view of the first motor case according to an embodiment of the present invention as viewed from the axial direction of the rotating shaft.
Figure 6:
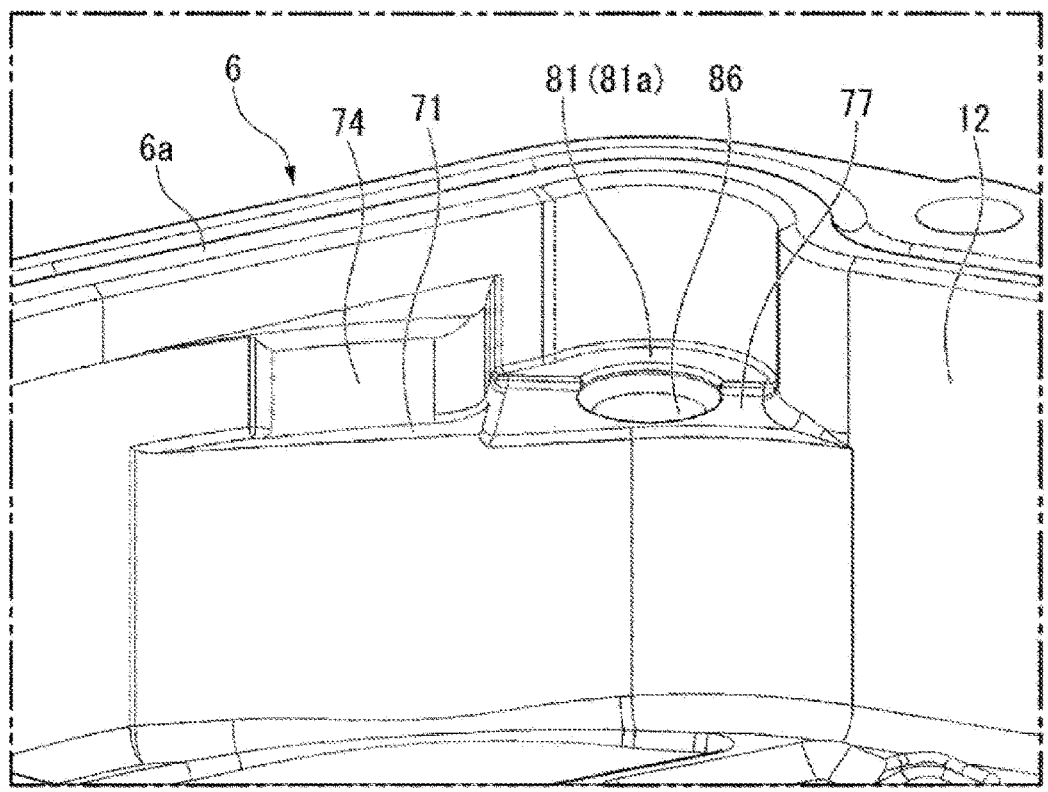
FIG. 6 is a perspective view showing the first fastening receiving portion and the first core receiving portion of the first motor case according to an embodiment of the present invention.

FIG. 5 is a plan view of the first motor case 6 as viewed from the axial direction of the rotating shaft 31. FIG. 6 is a perspective view showing the first fastening receiving portion 81 and the first core receiving portion 71 of the first motor case 6. As shown in FIG. 5 and FIG. 6, in the first motor case 6, a housing space opened by the opening 6a is formed by the bottom portion 10 and the inner circumferential wall 12. The inner circumferential wall 12 is formed in a circular shape centered on the axial center C1. The first motor case 6 includes a plurality of core receiving portions 71, 72, and 73 formed by forming a step portion near the bottom portion 10 of the inner circumferential wall 12, a plurality of core receiving portions 74, 75, and 76 provided at locations corresponding to the core receiving portions 71, 72, and 73 of the inner circumferential wall 12, a plurality of mounting seat portions 77 and 78 on which the fastening portions 24 of the stator 8 are placed, and a plurality of fastening receiving portions (an example of the fixing receiving portion in the claims) 81 and 82.

The present embodiment illustrates three core receiving portions, i.e. the first core receiving portion 71, the second core receiving portion 72, and the third core receiving portion 73, as the core receiving portions (an example of the core receiving portion in the claims) 71, 72, and 73 formed by forming the step portion near the bottom portion 10 of the inner circumferential wall 12, but the number thereof may be arbitrarily selected. Furthermore, the present embodiment illustrates three core receiving portions, i.e. the fourth core receiving portion 74, the fifth core receiving portion 75, and the sixth core receiving portion 76, as the plurality of core receiving portions 74, 75, and 76 of the inner circumferential wall 12, but the number thereof may be arbitrarily selected. In addition, the present embodiment illustrates two mounting seat portions, i.e. the first mounting seat portion 77 and the second mounting seat portion 78, as the plurality of mounting seat portions 77 and 78, but the number thereof may be arbitrarily selected. Further, the present embodiment illustrates two fastening receiving portions, i.e. the first fastening receiving portion 81 and the second fastening receiving portion 82, as the plurality of fastening receiving portions 81 and 82, but the number thereof may be arbitrarily selected. In the present embodiment, since one end of the stator core 20 in the axial direction is supported at three points of the core receiving portions 71, 72, and 73 in a well-balanced manner, there may be at least two fastening receiving portions 81 and 82. In this case, the number of fastening screws 28 can be reduced to two, and the number of parts can be reduced.

Here, the core receiving portions 71, 72, and 73 are preferably formed by cutting because high dimensional accuracy in the axial direction is required. If the core receiving portions 71, 72, and 73 are provided on the mounting seat portions 77 and 78, the core receiving portions 71 and 72 cannot be cut at the same time with one tool. Therefore, in the present embodiment, the core receiving portions 71, 72, and 73 are provided on the radial inner side with respect to the mounting seat portions 77 and 78. As a result, the core receiving portions 71 and 72 can be cut at the same time with one tool, so that the core receiving portions 71, 72, and 73 can be formed with high accuracy. Further, since the portion other than the mounting seat portions 77 and 78, which is the portion on the radial outer side of the stator core 20, is unnecessary, the stator core 20 can be miniaturized. Specifically, as shown in FIG. 4, the dimensions of the stator core 20 can be reduced in the direction perpendicular to the rotating axis line (axial center C4) of the output shaft 48 (direction along the tangent line C5) and in the direction parallel thereto (direction along the tangent line C6).

A power feeding opening 84 is formed in the bottom portion 10 of the first motor case 6. A power feeding portion (not shown) for feeding power to the stator 8 is arranged in the power feeding opening 84. The first core receiving portion 71, the second core receiving portion 72, and the third core receiving portion 73 are provided on the inner circumferential wall 12 to avoid the power feeding opening 84, and are provided at three locations at intervals of 120° in the circumferential direction. That is, the first core receiving portion 71 to the third core receiving portion 73 are arranged so as to avoid the power feeding portion (not shown).

The first core receiving portion 71, the second core receiving portion 72, and the third core receiving portion 73 project from the inner circumferential wall 12 toward the radial inner side, and each support surface facing the opening 6a is accurately formed (processed) so as to be orthogonal to the axis line C. The end portions in the axial direction of the first manufacturing error absorbing portion 23A, the second manufacturing error absorbing portion 23B, and the third manufacturing error absorbing portion 23C (see FIG. 4) of the stator 8 are abutted (supported) in the axial direction from the side of the opening 6a on the support surfaces of the first core receiving portion 71, the second core receiving portion 72, and the third core receiving portion 73.

The fourth core receiving portion 74, the fifth core receiving portion 75, and the sixth core receiving portion 76 has a shape that projects from the support surfaces of the first core receiving portion 71, the second core receiving portion 72, and the third core receiving portion 73 toward the opening 6a. The end portions in the radial direction of the first manufacturing error absorbing portion 23A, the second manufacturing error absorbing portion 23B, and the third manufacturing error absorbing portion 23C of the stator 8 are abutted (supported) in the radial direction on the support surfaces, facing the radial inner side, of such fourth core receiving portion 74, fifth core receiving portion 75, and sixth core receiving portion 76.

The first core receiving portion 71 and the fourth core receiving portion 74, the second core receiving portion 72 and the fifth core receiving portion 75, and the third core receiving portion 73 and the sixth core receiving portion 76 are respectively provided at the same positions in the circumferential direction. Further, the first core receiving portion 71 and the second core receiving portion 72 are arranged adjacent to both sides of the power feeding opening 84 in the circumferential direction, and the third core receiving portion 73 is arranged on the side opposite to the power feeding opening 84 with respect to the rotating shaft 31 (axial center C1). As a result, the core receiving portions 71, 72, and 73 and the core receiving portions 74, 75, and 76 are respectively arranged at intervals of 120° in the circumferential direction, so that the stator core 20 can be supported in a well-balanced manner.

The first mounting seat portion 77 and the second mounting seat portion 78 project toward the radial outer side from the inner circumferential wall 12 so as to correspond to the fastening portions 24 of the stator 8. Further, the first mounting seat portion 77 and the second mounting seat portion 78 are arranged on the radial outer side with respect to the first core receiving portion 71, the second core receiving portion 72, and the third core receiving portion 73. That is, the first mounting seat portion 77 and the second mounting seat portion 78 are provided at intervals of 180° in the circumferential direction so as to face each other in the radial direction with the rotating axis line (axial center C1) of the first motor case 6 as the center. The first mounting seat portion 77 and the second mounting seat portion 78 are each provided with a screw hole (an example of the fixed hole in the claims) 86 extending in the axial direction.

A screw portion 28a (see FIG. 3) of the fastening screw 28 for fixing the stator 8 to the first motor case 6 is screwed into the screw hole 86. The first mounting seat portion 77 is provided side by side with the first core receiving portion 71 in the circumferential direction so as to correspond to the first fastening portion 24A of the stator 8. That is, the first mounting seat portion 77 is provided in the vicinity of the first core receiving portion 71 and the fourth core receiving portion 74 in the circumferential direction and the radial direction. The second mounting seat portion 78 is provided between the second core receiving portion 72 and the fifth core receiving portion 75 and the third core receiving portion 73 and the sixth core receiving portion 76 in the circumferential direction so as to correspond to the second fastening portion 24B of the stator 8.

The first fastening receiving portion 81 and the second fastening receiving portion 82 are respectively provided on the first mounting seat portion 77 and the second mounting seat portion 78. That is, the first fastening receiving portion 81 and the second fastening receiving portion 82 are provided at intervals of 180° in the circumferential direction so as to face each other with the axial center C1 of the stator 8 as the center. Further, the first fastening receiving portion 81 and the second fastening receiving portion 82 are provided on the outer circumference (that is, radial outer side) of the arc C3 that passes through the center C2 of the screw hole 86 with the axial center C1 of the stator 8 as the center.

Figure 7:
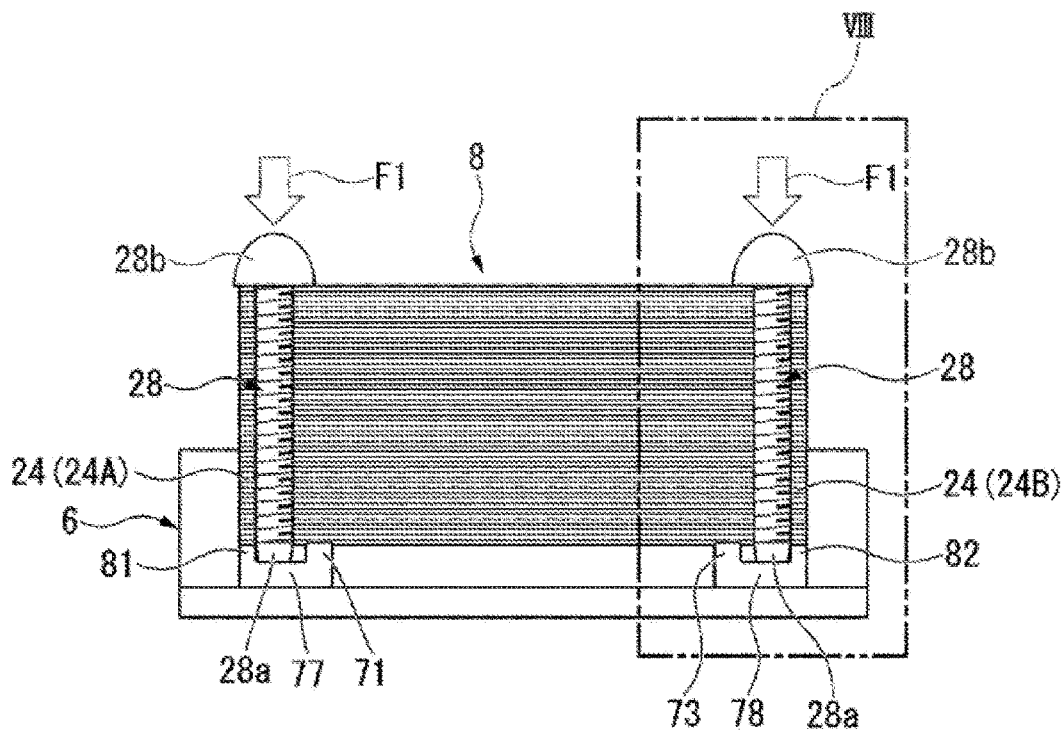
FIG. 7 is a conceptual diagram in which the stator is fastened and fixed to the first motor case according to an embodiment of the present invention with the fastening screw.
Figure 8:
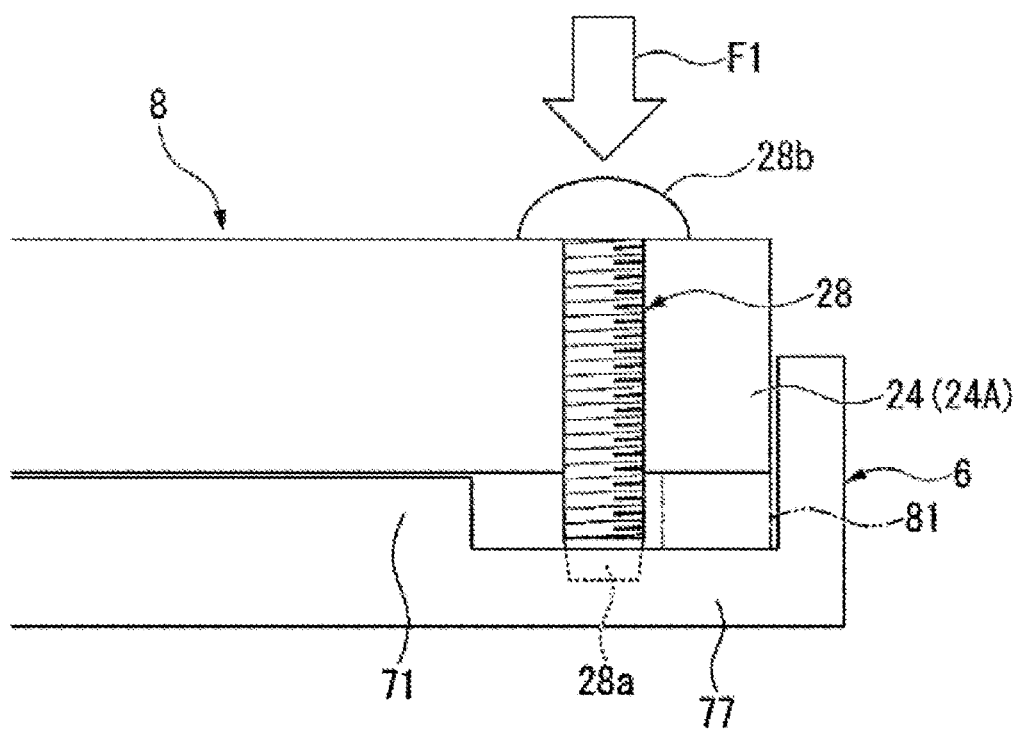
FIG. 8 is an enlarged conceptual diagram of the part VIII of FIG. 7.

FIG. 7 is a conceptual diagram in which the stator 8 is fastened and fixed to the first motor case 6 with the fastening screw 28. FIG. 8 is an enlarged conceptual diagram of the part VIII of FIG. 7. As shown in FIG. 5, the first fastening receiving portion 81 and the second fastening receiving portion 82 are formed in a substantially arc shape as viewed from the axial direction. That is, the outer circumferences of the first fastening receiving portion 81 and the second fastening receiving portion 82 are formed in a substantially arc shape along the outer circumferences of the first mounting seat portion 77 and the second mounting seat portion 78, respectively. Further, the inner circumferences of the first fastening receiving portion 81 and the second fastening receiving portion 82 are formed in an arc shape along the screw hole 86, respectively.

In addition, two end portions of the first fastening receiving portion 81 and the second fastening receiving portion 82 in the longitudinal direction as viewed from the axial direction are formed in a straight line shape along the arc C3. The first fastening receiving portion 81 and the second fastening receiving portion 82 have a quadrangular (rectangular) cross-sectional shape along the axial direction. Accordingly, the receiving surfaces (upper end surfaces) 81a and 82a of the first fastening receiving portion 81 and the second fastening receiving portion 82 are formed flat. As a result, the receiving surfaces 81a and 82a of the first fastening receiving portion 81 and the second fastening receiving portion 82 are ensured to be relatively large. Furthermore, as shown in FIG. 7 and FIG. 8, the first fastening receiving portion 81 and the second fastening receiving portion 82 are provided at positions overlapping the head portions 28b of the fastening screws 28 in the axial direction.

Here, as shown in FIG. 6, FIG. 7, and FIG. 8, the height of each support surface of the first core receiving portion 71, the second core receiving portion 72, and the third core receiving portion 73 in the axial direction from the bottom portion 10, and the height of each of the receiving surfaces 81a and 82a of the first fastening receiving portion 81 and the second fastening receiving portion 82 in the axial direction from the bottom portion 10 are greater than the heights of the first mounting seat portion 77 and the second mounting seat portion 78 in the axial direction from the bottom portion 10. In other words, the support surfaces of the first core receiving portion 71, the second core receiving portion 72, and the third core receiving portion 73, and the receiving surfaces 81a and 82a of the first fastening receiving portion 81 and the second fastening receiving portion 82 project in the direction (that is, the direction of the opening 6a) of the stator 8 (the core body portion 21, see FIG. 7) with respect to the first mounting seat portion 77 and the second mounting seat portion 78 in the axial direction.

Further, in the present embodiment, when the direction of the bottom portion 10 is "−" (minus) and the direction of the stator 8 is "+" (plus) with respect to the support surfaces of the core receiving portions 71, 72, and 73, the positions of the receiving surfaces 81a and 82a of the first fastening receiving portion 81 and the second fastening receiving portion 82 are, for example, −0.1 mm to 0.3 mm with respect to the support surfaces of the core receiving portions 71, 72, and 73. However, the receiving surfaces 81a and 82a of the first fastening receiving portion 81 and the second fastening receiving portion 82 with respect to the support surfaces of the core receiving portions 71, 72, and 73 are not limited thereto. By setting the projection amount of each of the receiving surfaces 81a and 82a with respect to the support surfaces of the core receiving portions 71, 72, and 73 to 0.3 mm or less, the core body portion 21 of the stator 8 and the support surfaces of the core receiving portions 71, 72, and 73 can be brought into contact with each other by the fastening torque of the fastening screw 28.

<Assembly of the Stator>

Next, the assembly of the stator 8 will be described. As shown in FIG. 3 to FIG. 5 and FIG. 7, when the stator 8 is assembled, the stator 8 is first arranged in the housing space from the opening 6a of the first motor case 6. The stator 8 is provided with the first manufacturing error absorbing portion 23A, the second manufacturing error absorbing portion 23B (see FIG. 4), and the third manufacturing error absorbing portion 23C.

The first core receiving portion 71, the second core receiving portion 72, and the third core receiving portion 73 receive the first manufacturing error absorbing portion 23A, the second manufacturing error absorbing portion 23B, and the third manufacturing error absorbing portion 23C in the axial direction. In other words, the first manufacturing error absorbing portion 23A, the second manufacturing error absorbing portion 23B, and the third manufacturing error absorbing portion 23C are supported by the first core receiving portion 71, the second core receiving portion 72, and the third core receiving portion 73 in the axial direction.

Further, the first manufacturing error absorbing portion 23A, the second manufacturing error absorbing portion 23B, and the third manufacturing error absorbing portion 23C are supported by the fourth core receiving portion 74, the fifth core receiving portion 75, and the sixth core receiving portion 76 in a form of stretching in the radial direction. In this state, the receiving surfaces 81a and 82a of the first fastening receiving portion 81 and the second fastening receiving portion 82 receive the first fastening portion 24A and the second fastening portion 24B of the stator 8 in the axial direction. In other words, the first fastening portion 24A and the second fastening portion 24B of the stator 8 are supported in the axial direction by the receiving surfaces 81a and 82a of the first fastening receiving portion 81 and the second fastening receiving portion 82.

Next, from this state, the fastening screws 28 are inserted into the screw holes 86 of the first mounting seat portion 77 and the second mounting seat portion 78 from above the first mounting seat portion 77 and the second mounting seat portion 78. Then, the screw portion 28a of the fastening screw 28 is fastened into the screw hole 86 of each of the mounting seat portions 77 and 78. At this time, the first fastening portion 24A and the second fastening portion 24B fastened and fixed by the fastening screws 28 are received by the receiving surfaces 81a and 82a of the first fastening receiving portion 81 and the second fastening receiving portion 82. As a result, the stator 8 is supported in the axial direction by the first core receiving portion 71, the second core receiving portion 72, and the third core receiving portion 73, and is fastened and fixed to the first motor case 6 in a state of being supported in the radial direction by the fourth core receiving portion 74, the fifth core receiving portion 75, and the sixth core receiving portion 76.

<Operation of the Motor Device>

Next, the operation of the motor device 1 will be described. As shown in FIG. 2, in the motor device 1, the rotor 9 is rotatably arranged on the radial inner side of the stator 8 via a minute gap. The rotor 9 rotates by receiving the rotating magnetic field formed by the stator 8. Here, an end portion (one end portion) of the rotating shaft 31 on the side opposite to the side of the worm shaft 44 is press-fitted (fitted) into the shaft core hole 69 of the rotor core 32. As a result, the rotor core 32 rotates, so that the rotating shaft 31 rotates integrally with the rotor core 32. The rotating shaft 31 rotates, so that the output shaft 48 rotates via the worm shaft 44 and the worm wheel 45.

Effect of the Embodiment

In the motor device 1 of the above-described embodiment, as shown in FIG. 5, FIG. 7, and FIG. 8, the end portions in the axial direction of the first fastening portion 24A and the second fastening portion 24B of the stator 8 fastened and fixed by the fastening screws 28 are received by the receiving surfaces 81a and 82a of the first fastening receiving portion 81 and the second fastening receiving portion 82 of the first motor case 6. The end portions in the axial direction of the core body portion 21 (the first manufacturing error absorbing portion 23A, the second manufacturing error absorbing portion 23B, and the third manufacturing error absorbing portion 23C) of the stator 8 are received by the first core receiving portion 71, the second core receiving portion 72, and the third core receiving portion 73. Therefore, a part of the fastening force F1 of the fastening screw 28 can be received by the first fastening receiving portion 81 and the second fastening receiving portion 82 through the first fastening portion 24A and the second fastening portion 24B. As a result, the fastening force F1 of the fastening screw 28 can suppress the radial center portion of the stator 8 from rising in the axial direction with the first core receiving portion 71, the second core receiving portion 72, and the third core receiving portion 73 as fulcrums, and the deformation of the stator 8 can be kept small.

Therefore, the tilt of the stator 8 can be suppressed, and further the tilt direction of the stator 8 can be controlled. As a result, the roundness of the inner diameter of the stator 8 can be satisfactorily secured, and the assembly accuracy of the motor 2 (see FIG. 2) can be improved. Therefore, the operating noise of the motor 2 can be reduced, further the air gap between the stator 8 and the rotor 9 can be easily secured, and the interference between the stator 8 and the rotor 9 can be prevented.

In addition, the first fastening receiving portion 81 and the second fastening receiving portion 82 are provided on the outer circumference (that is, the radial outer side) of the arc C3 passing through the center C2 of the screw hole 86 with the axial center C1 of the stator 8 as the center. Therefore, a part of the fastening force F1 of the fastening screw 28 can be received on the opposite side of the first core receiving portion 71, the second core receiving portion 72, and the third core receiving portion 73 (particularly, the first core receiving portion 71) in the radial direction with respect to the fastening screw 28. As a result, it is possible to suitably suppress the deformation that the radial center portion of the stator 8 is raised in the axial direction with the first core receiving portion 71 as a fulcrum due to the fastening force F1 of the fastening screw 28.

Furthermore, the first fastening receiving portion 81 and the second fastening receiving portion 82 are provided at positions overlapping the head portions 28b of the fastening screws 28 in the axial direction. Therefore, the fastening force F1 of the fastening screws 28 can be efficiently received by the first fastening receiving portion 81 and the second fastening receiving portion 82. As a result, it is possible to suitably suppress the deformation that the radial center portion of the stator 8 is raised in the axial direction with the first core receiving portion 71, the second core receiving portion 72, and the third core receiving portion 73 as fulcrums due to the fastening force F1 of the fastening screw 28.

Further, the first fastening receiving portion 81 and the second fastening receiving portion 82 are provided so as to face each other with the axial center C1 of the first motor case 6 as the center. As a result, the fastening force F1 of the fastening screw 28 can be received in a well-balanced manner by the first fastening receiving portion 81 and the second fastening receiving portion 82 on both sides of the stator 8.

In addition, the first core receiving portion 71 is arranged side by side in the circumferential direction on one first fastening receiving portion 81. As a result, the fastening force F1 of the fastening screw 28 received by the first fastening receiving portion 81 can be received by the first fastening receiving portion 81 and the first core receiving portion 71 closest to the first fastening receiving portion 81. In other words, the fastening force F1 of the fastening screw 28 can be received by the first fastening receiving portion 81 and the first core receiving portion 71 located on both sides of the fastening screw 28 (the attachment hole 24a, the screw hole 86). Therefore, it is possible to more suitably suppress the deformation that the radial center portion of the stator 8 is raised in the axial direction with the first core receiving portion 71 as a fulcrum due to the fastening force F1 of the fastening screw 28.

Here, the support surfaces of the first core receiving portion 71, the second core receiving portion 72, and the third core receiving portion 73, and the receiving surfaces 81a and 82a of the first fastening receiving portion 81 and the second fastening receiving portion 82 project in the direction of the stator 8 (the core body portion 21) with respect to the first mounting seat portion 77 and the second mounting seat portion 78 in the axial direction. Therefore, when the core body portion 21 is fastened to the first motor case 6 by the fastening screw 28, the portion of the core body portion 21 that comes into contact with the first motor case 6 (the portion received by the first motor case 6) can be reliably arranged in a well-balanced manner in the circumferential direction. Therefore, the load applied to the core body portion 21 by the fastening force F1 of the fastening screw 28 can be distributed in a well-balanced manner.

In addition, the first core receiving portion 71, the second core receiving portion 72, and the third core receiving portion 73 are arranged at three locations at intervals of 120° in the circumferential direction. As a result, the first manufacturing error absorbing portion 23A, the second manufacturing error absorbing portion 23B, and the third manufacturing error absorbing portion 23C of the stator 8 can be supported in a more balanced manner in the axial direction by three core receiving portions, i.e. the first core receiving portion 71, the second core receiving portion 72, and the third core receiving portion 73.

Further, when the direction of the bottom portion 10 is "−" (minus) and the direction of the stator 8 is "+" (plus) with respect to the support surfaces of the core receiving portions 71, 72, and 73, the positions of the receiving surfaces 81a and 82a of the first fastening receiving portion 81 and the second fastening receiving portion 82 are, for example, −0.1 mm to 0.3 mm with respect to the support surfaces of the core receiving portions 71, 72, and 73. Therefore, the fastening force F1 of the fastening screw 28 can be suitably received by the first fastening receiving portion 81 and the second fastening receiving portion 82 closest to the location where the fastening force F1 is generated. As a result, it is possible to more suitably suppress the deformation that the radial center portion of the stator 8 is raised in the axial direction with the first core receiving portion 71, the second core receiving portion 72, and the third core receiving portion 73 (particularly, the first core receiving portion 71) as fulcrums due to the fastening force F1 of the fastening screw 28.

Moreover, the first core receiving portion 71, the second core receiving portion 72, and the third core receiving portion 73 are arranged to avoid the power feeding opening 84 (the power feeding portion). Therefore, the power feeding portion can be laid out (arranged) at the optimum position without being affected by the first core receiving portion 71, the second core receiving portion 72, and the third core receiving portion 73.

Figure 9:
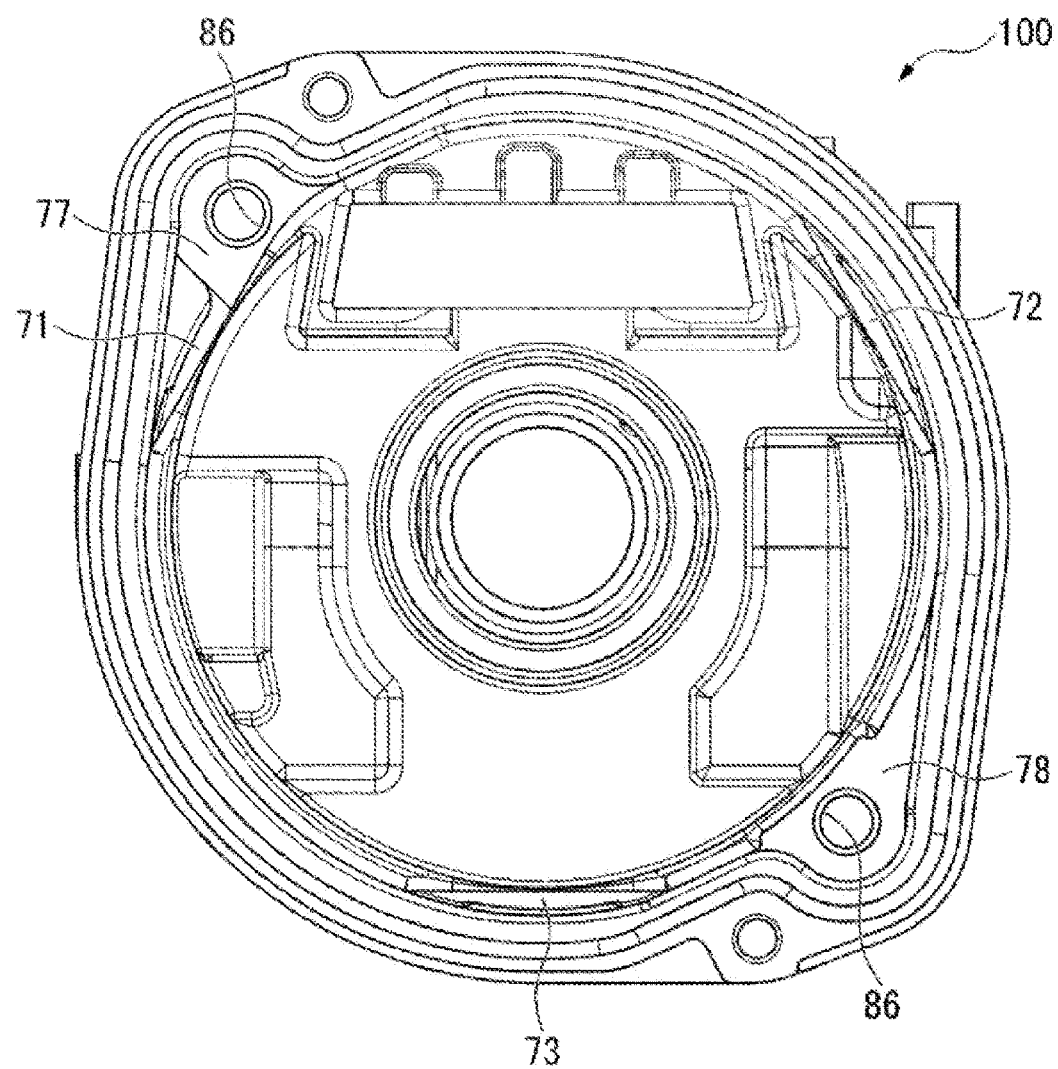
FIG. 9 is a plan view of the first motor case of the comparative example as viewed from the axial direction.
Figure 10:
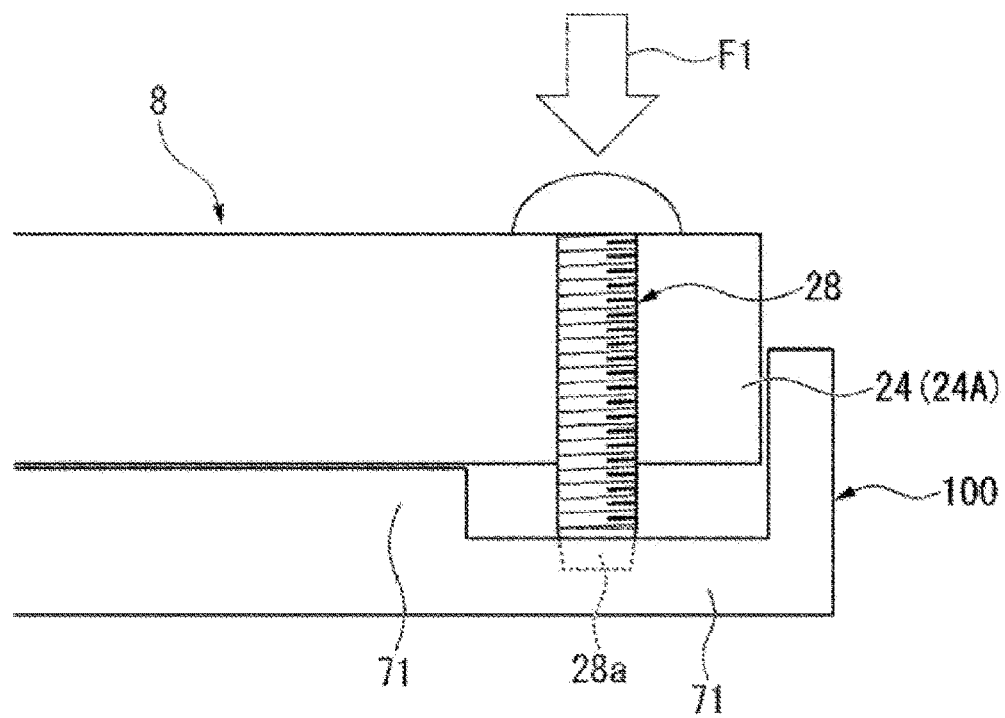
FIG. 10 is a conceptual diagram in which the stator is fastened and fixed to the first motor case of the comparative example with the fastening screw.
Figure 11:
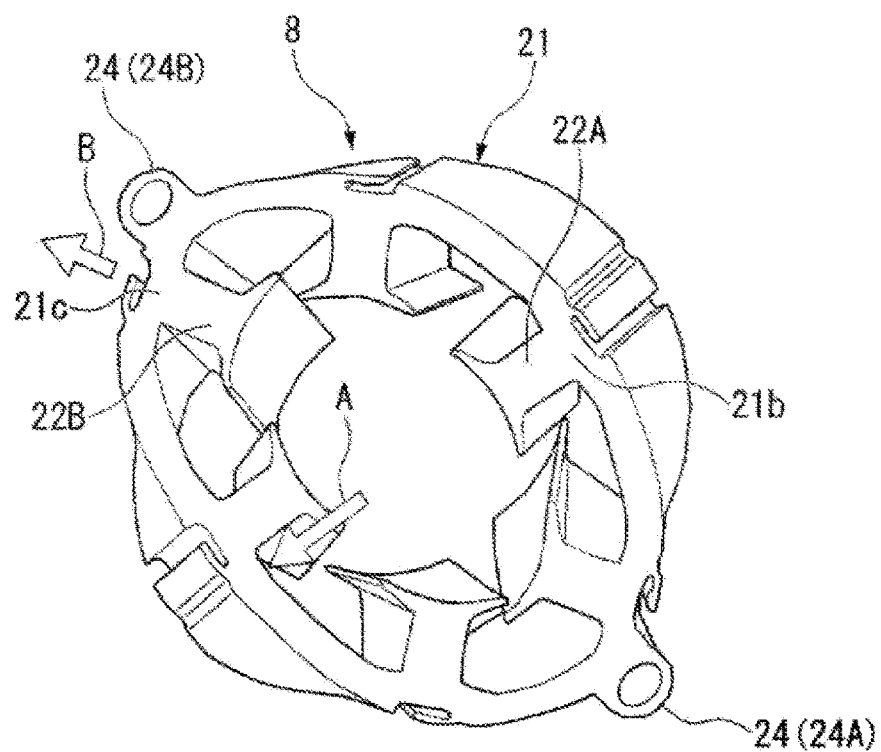
FIG. 11 is a simulation diagram exaggeratedly showing the tilt of the stator fastened and fixed to the first motor case of the comparative example with the fastening screw.

Hereinafter, the effects of the present embodiment will be described in comparison with the comparative example with reference to FIG. 7 to FIG. 13, FIG. 22, FIG. 23A, and FIG. 23B. FIG. 9 is a plan view of a first motor case 100 of the comparative example as viewed from the axial direction. FIG. 10 is a conceptual diagram in which the stator 8 is fastened and fixed to the first motor case 100 of the comparative example with the fastening screw 28. FIG. 11 is a simulation diagram exaggeratedly showing the tilt (deformation) of the stator 8 fastened and fixed to the first motor case 100 of the comparative example with the fastening screw 28.

As shown in FIG. 9, FIG. 10, and FIG. 11, the first motor case 100 of the comparative example does not include the first fastening receiving portion 81 and the second fastening receiving portion 82 of the embodiment. Therefore, it can be confirmed that, in the stator 8, the portion 21b, corresponding to the tooth 22A of the teeth 22, of the annular core body portion 21 tilts relatively largely to the radial inner side as shown by the arrow A. It can also be confirmed that the portion 21c, corresponding to the tooth 22B of the teeth 22, tilts relatively largely to the radial outer side as shown by the arrow B.

Figure 12:
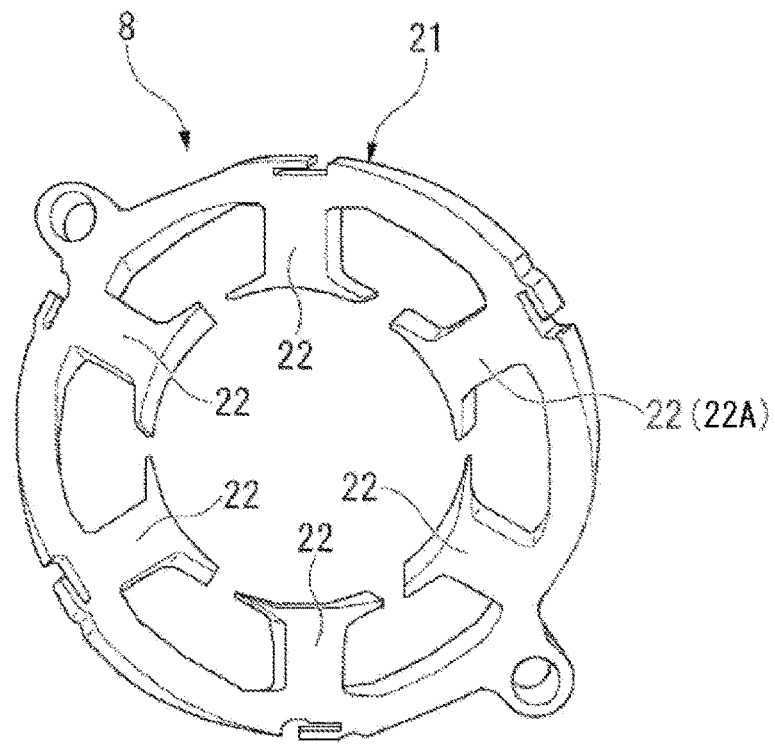
FIG. 12 is a simulation diagram exaggeratedly showing the tilt of the stator fastened to the first motor case according to an embodiment of the present invention with the fastening screw.

FIG. 12 is a simulation diagram exaggeratedly showing the tilt (deformation) of the stator 8 fastened and fixed to the first motor case 6 of the embodiment with the fastening screw 28. As shown in FIG. 5, FIG. 8, and FIG. 12, the first motor case 6 of the embodiment includes the first fastening receiving portion 81 and the second fastening receiving portion 82 of the embodiment. As a result, the tilt of the portion, corresponding to the plurality of (six in the embodiment) teeth 22, of the core body portion 21 of the stator 8 is suppressed. That is, it can be confirmed that the tilt of the entire core body portion 21 can be suppressed. Further, the core body portion 21 is controlled in a well-balanced manner, so that the tilt direction of the portion corresponding to the plurality of (six in the embodiment) teeth 22 does not vary. That is, the tilt direction of the entire core body portion 21 can be controlled in a well-balanced manner.

Figure 13:
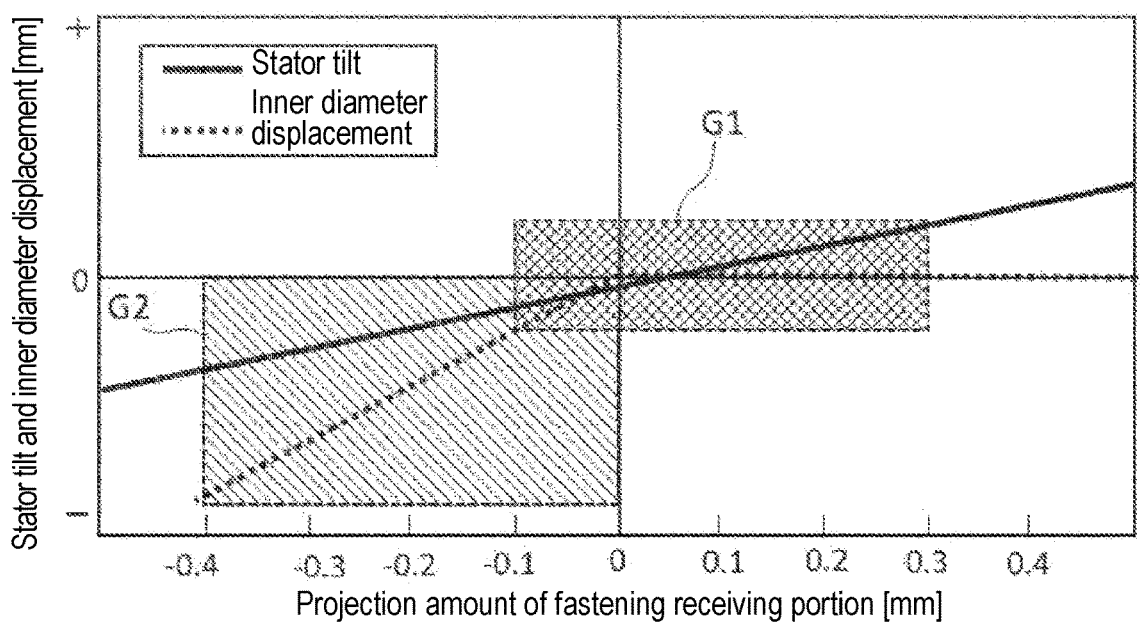
FIG. 13 is a graph illustrating the tilt and inner diameter displacement of the stator according to an embodiment of the present invention and the comparative example.

FIG. 13 is a graph illustrating the tilt (mm) and the inner diameter displacement (mm) of the stator 8 after fastening with respect to the stator 8 before fastening when the stator 8 is fastened to the first motor case 6 with the fastening screw 28. The hatched portion G1 indicates the range corresponding to the projection amount of the receiving surfaces 81a and 82a in the embodiment, and the hatched portion G2 indicates the range corresponding to the projection amount of the receiving surfaces 81a and 82a in the comparative example.

In FIG. 13, the vertical axis of the graph shown by the solid line indicates the tilt (mm) of the stator 8. The tilt of the stator 8 refers to the displacement amount in the radial direction when the radial centers of the core body portion 21 measured at measurement points provided at a plurality of locations along the axial direction of the stator 8 are compared before and after the fastening screw 28 is fastened. The vertical axis shows the tilt toward the side of the gear case 40 in the axial direction of the output shaft 48 (axial center C4) as + and shows the tilt toward the side of the cover 63 in the axial direction of the output shaft 48 (axial center C4) as − with the radial center of the core body portion 21 before fastening as the origin. In FIG. 13, only the data of the measurement point having the largest displacement amount among the measurement points is shown. The horizontal axis indicates the projection amounts of the receiving surfaces 81a and 82a of the first fastening receiving portion 81 and the second fastening receiving portion 82 with respect to the support surfaces of the core receiving portions 71, 72, and 73.

In addition, the vertical axis of the graph shown by the dotted line indicates the inner diameter displacement (mm) of the stator 8. The inner diameter displacement of the stator 8 refers to the displacement amount in the radial direction when the measurement points provided on the teeth 22 are compared before and after the fastening screw 28 is fastened. The vertical axis shows the displacement direction of the measurement point having the largest displacement among the measurement points as − and the opposite direction as +. The horizontal axis indicates the projection amounts of the receiving surfaces 81a and 82a of the first fastening receiving portion 81 and the second fastening receiving portion 82 with respect to the support surfaces of the core receiving portions 71, 72, and 73. In FIG. 13, only the data of the tooth 22A having the largest displacement amount among the teeth 22 is shown.

As shown by the hatched portion G2 of FIG. 13, in the stator 8 of the comparative example, the projection amount of each of the receiving surfaces 81a and 82a is set to −0.4 mm to 0 mm. In FIG. 11 to FIG. 13, it can be confirmed that, in the stator 8 of the comparative example, the tilt direction of the portion, corresponding to the tooth 22A, of the core body portion 21 is biased toward the radial inner side as shown by the arrow A, and the displacement amount is large. By contrast, in the stator 8 of the embodiment, as shown by the hatched portion G1 of FIG. 13, the projection amount of each of the receiving surfaces 81a and 82a is set to −0.1 mm to 0.3 mm. In FIG. 11 to FIG. 13, it can be confirmed that, in the stator 8 of the embodiment, the tilt direction of the portion, corresponding to the tooth 22A, of the core body portion 21 is controlled in a well-balanced manner toward the radial inner and outer sides, and the tilt and the displacement amount of the inner diameter displacement of the stator 8 are kept small. As a result, the roundness of the inner diameter of the stator 8 can be satisfactorily secured, and the assembly accuracy of the motor 2 (see FIG. 2) can be improved.

Figure 22:
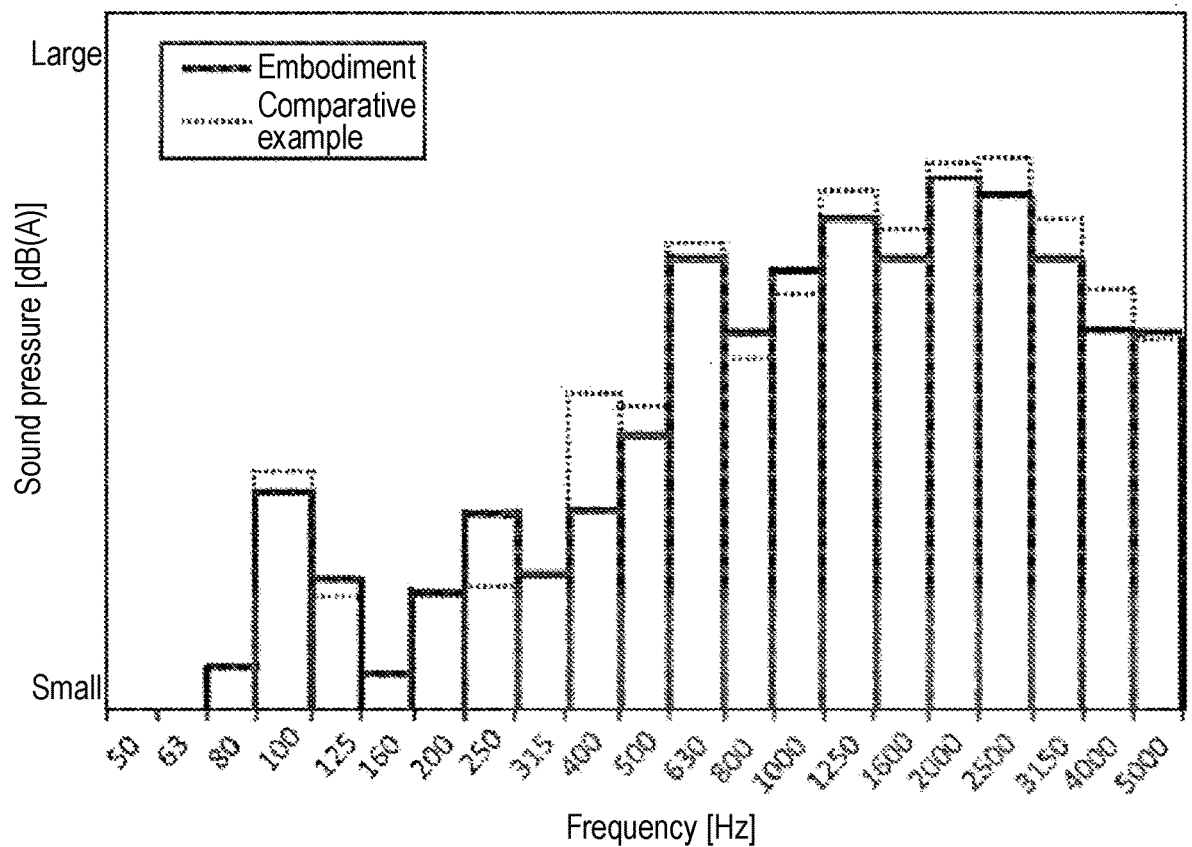
FIG. 22 is a graph illustrating the loudness of the operating noise of the motor device according to an embodiment of the present invention and the comparative example.

FIG. 22 shows the sound pressure (dB(A)) at each frequency (Hz) of the operating noise of the motor device 1 in the embodiment of the present invention and the comparative example. Further, the graph shown by the solid line is the data of the embodiment, and the graph shown by the dotted line shows the data of the comparative example. In FIG. 22, it can be confirmed that the sound pressure of the motor device 1 of the embodiment is reduced particularly in the frequency band of 400 Hz as compared with the comparative example.

Figure 23A:
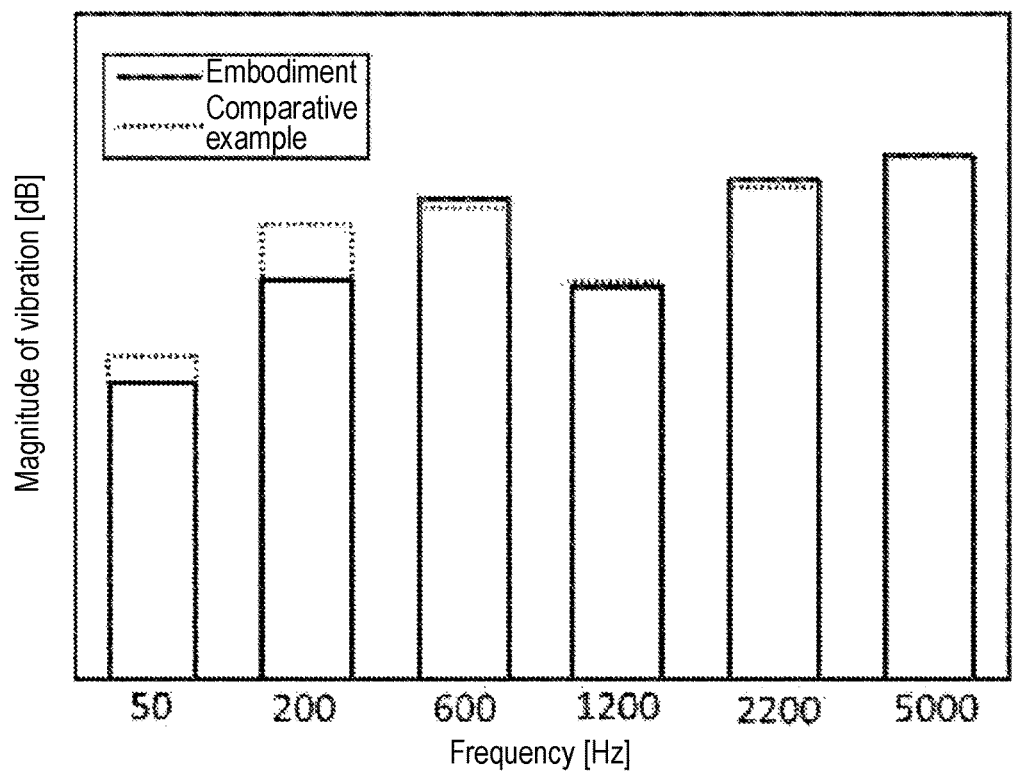
FIG. 23A is a graph illustrating the magnitude of the vibration of the motor device according to an embodiment of the present invention and the comparative example.
Figure 23B:
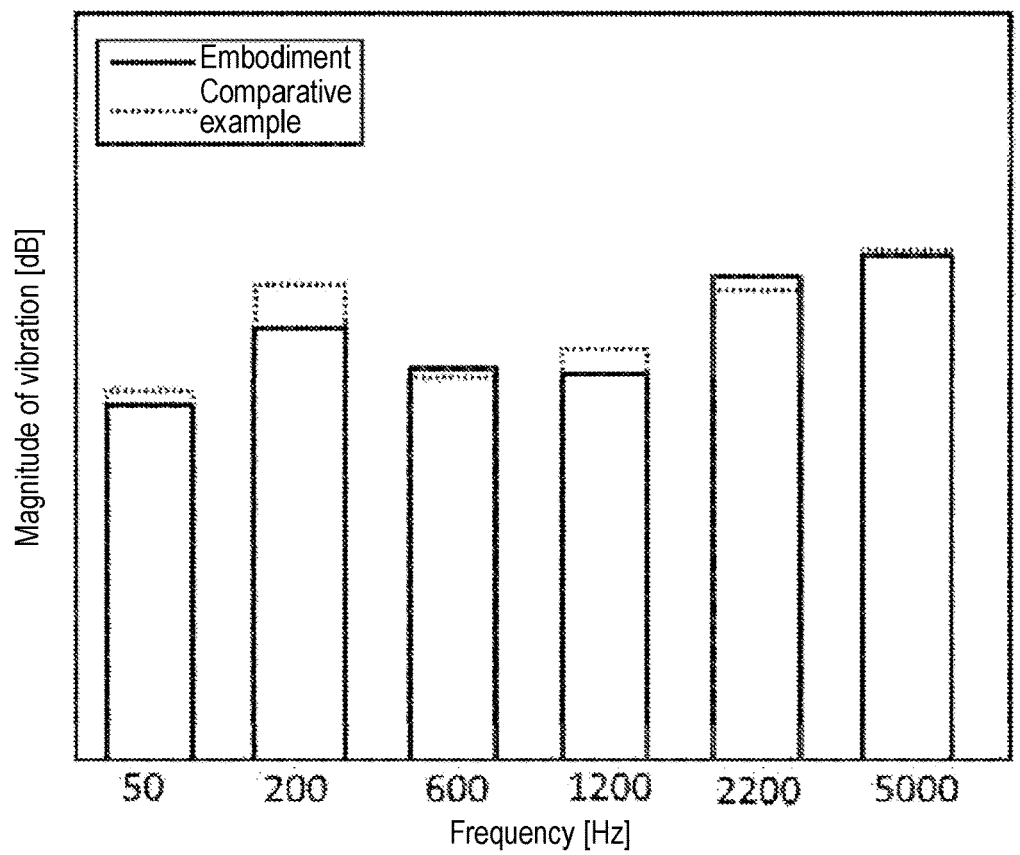
FIG. 23B is a graph illustrating the magnitude of the vibration of the motor device according to an embodiment of the present invention and the comparative example.

FIG. 23A and FIG. 23B show the magnitude (dB) of vibration at each frequency (Hz) of the vibration of the motor device 1 in the embodiment of the present invention and the comparative example. Further, the graph shown by the solid line is the data of the embodiment, and the graph shown by the dotted line shows the data of the comparative example. FIG. 23A shows data on radial vibration of the embodiment and the comparative example. FIG. 23B shows data on axial vibration of the embodiment and the comparative example. In FIG. 23A and FIG. 23B, it can be confirmed that the motor device 1 of the embodiment has reduced vibration particularly in the frequency band of 200 Hz as compared with the comparative example.

Here, in general, when the motor device is arranged in a vehicle, there is a concern that the noise caused by the operating noise and vibration of the motor device may propagate into the vehicle interior. In particular, low-frequency sounds are more likely to propagate into the vehicle interior than high-frequency sounds. Therefore, when the embodiment of the present invention is mounted on a vehicle, the operating noise and vibration of the motor device 1 can be suppressed in the low frequency band so the propagation of noise into the vehicle interior can be effectively suppressed.

Modified Example

Hereinafter, the first modified example to the eighth modified example of the first fastening receiving portion 81 will be described with reference to FIG. 14 to FIG. 21. In the first modified example to the eighth modified example, the same and similar configurations as those in the embodiment are designated by the same reference numerals, and detailed description thereof will be omitted.

Figure 14:
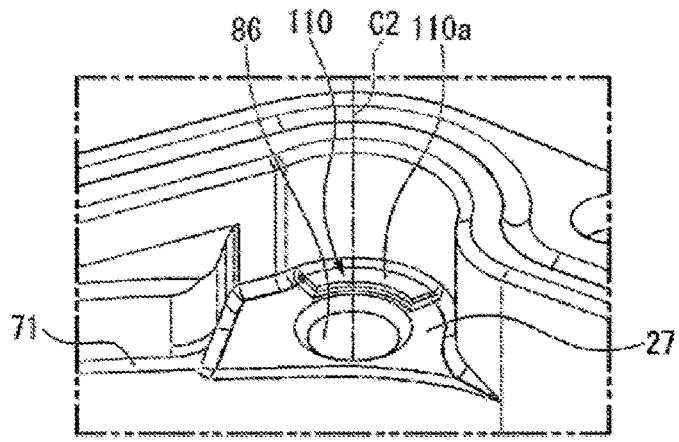
FIG. 14 is a perspective view showing the first fastening receiving portion of the first modified example according to an embodiment of the present invention.

FIG. 14 is a perspective view showing the first fastening receiving portion 110 of the first modified example. As shown in FIG. 14, like the first fastening receiving portion 81 of the embodiment, the outer circumference of the first fastening receiving portion 110 of the first modified example is formed in an arc shape along the outer circumference of the first mounting seat portion 77, and the inner circumference is formed in an arc shape along the screw hole 86. Further, both end portions of the first fastening receiving portion 110 in the longitudinal direction as viewed from the axial direction are formed along straight lines that extend radially at predetermined angles from the center C2 of the screw hole 86 toward the radial outer side. Further, like the first fastening receiving portion 81, the first fastening receiving portion 110 has a sectional shape in the radial direction that is formed in a quadrangular shape (rectangular shape), and the receiving surface 110a is formed flat.

Figure 15:
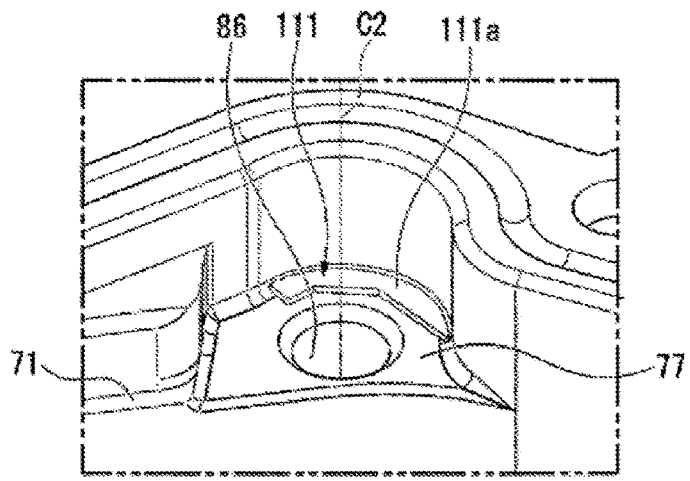
FIG. 15 is a perspective view showing the first fastening receiving portion of the second modified example according to an embodiment of the present invention.

FIG. 15 is a perspective view showing the first fastening receiving portion 111 of the second modified example. As shown in FIG. 15, like the first fastening receiving portion 81 of the embodiment, the outer circumference of the first fastening receiving portion 111 of the second modified example is formed in a curved shape along the outer circumference of the first mounting seat portion 77. Further, the inner circumference of the first fastening receiving portion 110 is formed in a polygonal shape along the outer circumference. In addition, one end portion of the first fastening receiving portion 110 in the longitudinal direction as viewed from the axial direction is formed along a straight line that extends radially at a predetermined angle from the center C2 of the screw hole 86 toward the radial outer side. The other end portion of the first fastening receiving portion 110 in the longitudinal direction as viewed from the axial direction is formed at a location where the inner circumference and the outer circumference intersect. Further, like the first fastening receiving portion 81, the first fastening receiving portion 111 has a sectional shape in the radial direction that is formed in a quadrangular shape (rectangular shape), and the receiving surface 111a is formed flat.

Figure 16:
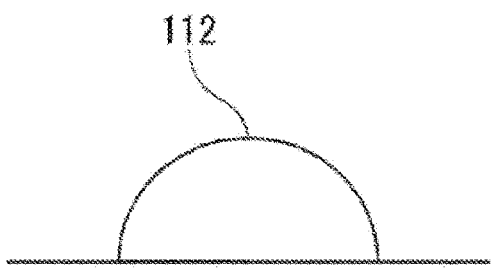
FIG. 16 is a conceptual diagram showing the first fastening receiving portion of the third modified example according to an embodiment of the present invention.

FIG. 16 is a conceptual diagram showing the first fastening receiving portion 112 of the third modified example. As shown in FIG. 16, the first fastening receiving portion 112 of the third modified example has a sectional shape in the radial direction that is formed in an arc shape.

Figure 17:
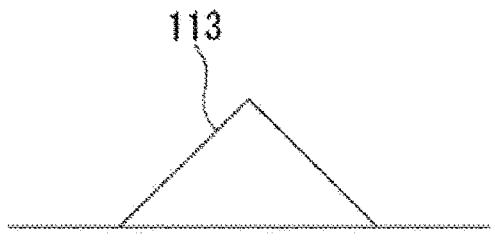
FIG. 17 is a conceptual diagram showing the first fastening receiving portion of the fourth modified example according to an embodiment of the present invention.

FIG. 17 is a conceptual diagram showing the first fastening receiving portion 113 of the fourth modified example. As shown in FIG. 17, the first fastening receiving portion 113 of the fourth modified example has a sectional shape in the radial direction that is formed in a triangular shape.

Figure 18:
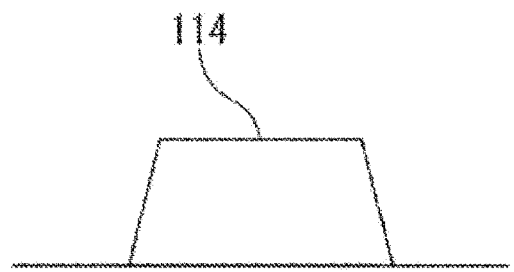
FIG. 18 is a conceptual diagram showing the first fastening receiving portion of the fifth modified example according to an embodiment of the present invention.

FIG. 18 is a conceptual diagram showing the first fastening receiving portion 114 of the fifth modified example. As shown in FIG. 18, the first fastening receiving portion 114 of the fifth modified example has a sectional shape in the radial direction that is formed in a trapezoidal shape.

Figure 19:
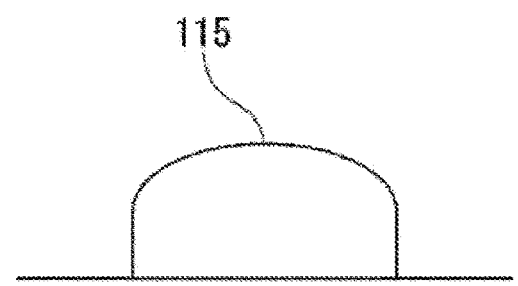
FIG. 19 is a conceptual diagram showing the first fastening receiving portion of the sixth modified example according to an embodiment of the present invention.

FIG. 19 is a conceptual diagram showing the first fastening receiving portion 115 of the sixth modified example. As shown in FIG. 19, the first fastening receiving portion 115 of the sixth modified example has a sectional shape in the radial direction that is formed in an arched semi-cylindrical shape.

Figure 20:
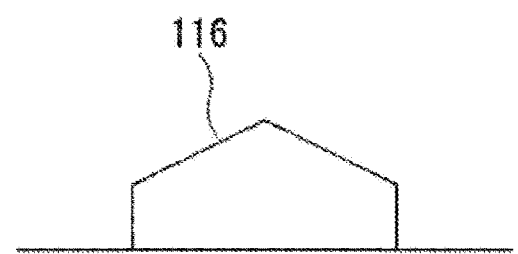
FIG. 20 is a conceptual diagram showing the first fastening receiving portion of the seventh modified example according to an embodiment of the present invention.

FIG. 20 is a conceptual diagram showing the first fastening receiving portion 116 of the seventh modified example. As shown in FIG. 20, the first fastening receiving portion 116 of the seventh modified example has a sectional shape in the radial direction that is formed in a pentagonal home base shape.

Figure 21:
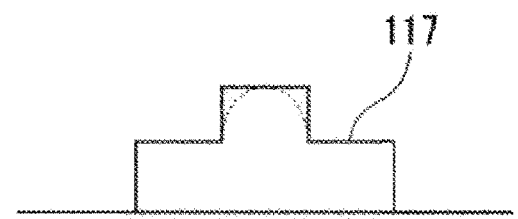
FIG. 21 is a conceptual diagram showing the first fastening receiving portion of the eighth modified example according to an embodiment of the present invention.

FIG. 21 is a conceptual diagram showing the first fastening receiving portion 117 of the eighth modified example. As shown in FIG. 21, the first fastening receiving portion 117 of the eighth modified example has a sectional shape in the radial direction that is formed in a convex shape. The tip of the first fastening receiving portion 117 may be formed in a convex curve. As described above, the configurations of the modified examples can also achieve the same effects as the above-described embodiment.

The present invention is not limited to the above-described embodiment, and includes various modifications to the above-described embodiment without departing from the spirit of the present invention. For example, the above-described embodiment illustrates the fastening screw 28 as an example of the fixing member, but the present invention is not limited thereto. Any member that can fix the core body portion 21 of the stator 8 to the first motor case 6 may be used. For example, as the fixing member, a rivet or the like may be used instead of the fastening screw 28.

The above-described embodiment illustrates a case where the motor device 1 is used as the drive source for a vehicle wiper device. However, the present invention is not limited thereto, and the above-described motor device 1 can be applied to various electric devices.

What is claimed is:

1. A motor, comprising:
   a stator around which coils are wound and which forms a rotating magnetic field for rotating a rotor; and
   a frame which houses the stator,
   wherein the stator comprises:
      a core body portion which forms an annular magnetic path; and
      a fixing portion which projects toward a radial outer side from an outer circumferential surface of the core body portion,
      wherein the fixing portion has a fixing hole which is formed to penetrate along a rotating axis line direction of the rotor and through which a fixing member for fixing the stator to the frame is inserted,
   wherein the frame comprises:
      a core receiving portion which receives an end portion of the core body portion in the rotating axis line direction;
      a fixing receiving portion which receives an end portion of the fixing portion in the rotating axis line direction; and
      a mounting seat portion on which the fixing portion is placed,
      wherein the fixing receiving portion is provided on the mounting seat portion, and
      the core receiving portion and the fixing receiving portion are projected toward a core body portion side with respect to the mounting seat portion.

2. The motor according to claim 1, wherein the fixing receiving portion is provided on a radial outer side of an arc that passes through a center of a fixed hole, to which the fixing member is fixed, with an axial center of the core body portion as a center.

3. The motor according to claim 1, wherein the fixing receiving portion is provided at a position overlapping the fixing member in the rotating axis line direction.

4. The motor according to claim 1, wherein two fixing receiving portions are provided so as to face each other with the axial center of the core body portion as the center, and the core receiving portion is arranged side by side on at least one of the fixing receiving portions.

5. The motor according to claim 1, wherein when the core body portion side is + and a side opposite to the core body portion is − with respect to the core receiving portion,
   a position of the fixing receiving portion is at a position of −0.1 mm to 0.3 mm with respect to the core receiving portion.

6. The motor according to claim 1, wherein the core receiving portions are at least provided at three locations at intervals of 120° in a circumferential direction.

7. The motor according to claim 1, wherein the core receiving portion is arranged to avoid a power feeding opening that feeds power to the stator.

* * * * *